US010119196B2

(12) United States Patent
Sivasankar et al.

(10) Patent No.: US 10,119,196 B2
(45) Date of Patent: Nov. 6, 2018

(54) ELECTROCHEMICAL PRODUCTION OF SYNTHESIS GAS FROM CARBON DIOXIDE

(71) Applicant: Liquid Light, Inc., Monmouth Junction, NJ (US)

(72) Inventors: Narayanappa Sivasankar, Plainsboro, NJ (US); Emily Barton Cole, Houston, TX (US); Kyle Teamey, Washington, DC (US)

(73) Assignee: Avantium Knowledge Centre B.V., Amsterdam (NL)

( * ) Notice: Subject to any disclaimer, the term of this patent is extended or adjusted under 35 U.S.C. 154(b) by 644 days.

(21) Appl. No.: 14/253,964

(22) Filed: Apr. 16, 2014

(65) Prior Publication Data
US 2014/0238871 A1 Aug. 28, 2014

Related U.S. Application Data

(62) Division of application No. 12/846,002, filed on Jul. 29, 2010, now Pat. No. 8,721,866.
(Continued)

(51) Int. Cl.
C25B 1/00 (2006.01)
C25B 1/02 (2006.01)
B01D 53/32 (2006.01)

(52) U.S. Cl.
CPC .............. C25B 1/02 (2013.01); C25B 1/00 (2013.01); C25B 1/003 (2013.01); *B01D 53/326* (2013.01);
(Continued)

(58) Field of Classification Search
CPC ......... C25B 1/00; C25B 1/02; C25B 11/0405; C25B 11/041; C25B 11/0415;
(Continued)

(56) References Cited

U.S. PATENT DOCUMENTS 1,280,622 A 10/1918 Andrews
1,962,140 A 6/1934 Dreyfus
(Continued)

FOREIGN PATENT DOCUMENTS

AU 2012202601 A1 5/2012
CA 2604569 A1 10/2006
(Continued)

OTHER PUBLICATIONS

C. Delacourt, P.L. Ridgway, J.B. Kerr, and J. Newman. Design of an Electrochemical Cell Making Syngas (CO+H2) from CO2 and H2O Reduction at Room Temperature. Journal of the Electrochemical Society. Nov. 2007. vol. 155, Issue 1. pp. B42-B49.*
(Continued)

*Primary Examiner* — Steven A. Friday
(74) *Attorney, Agent, or Firm* — Suiter Swantz pc llo

(57) ABSTRACT

A method for electrochemical production of synthesis gas from carbon dioxide is disclosed. The method generally includes steps (A) to (C). Step (A) may bubble the carbon dioxide into a solution of an electrolyte and a catalyst in a divided electrochemical cell. The divided electrochemical cell may include an anode in a first cell compartment and a cathode in a second cell compartment. The cathode generally reduces the carbon dioxide into a plurality of components. Step (B) may establish a molar ratio of the components in the synthesis gas by adjusting at least one of (i) a cathode material and (ii) a surface morphology of the cathode. Step (C) may separate the synthesis gas from the solution.

9 Claims, 8 Drawing Sheets

Related U.S. Application Data

(60) Provisional application No. 61/315,628, filed on Mar. 19, 2010.

(52) U.S. Cl.
CPC .... *B01D 2256/12* (2013.01); *B01D 2257/504* (2013.01); *Y02E 60/366* (2013.01); *Y02P 20/152* (2015.11)

(58) Field of Classification Search
CPC ............. C25B 11/0442; C25B 11/0447; C25B 11/0473; C25B 11/0478–11/0494; Y02P 20/152

See application file for complete search history.

(56) References Cited

U.S. PATENT DOCUMENTS

| | | |
|---|---|---|
| 2,060,880 A | 11/1936 | Lazier et al. |
| 3,019,256 A | 1/1962 | Dunn |
| 3,088,990 A | 5/1963 | Rightmire et al. |
| 3,220,941 A | 11/1965 | Osborne et al. |
| 3,236,879 A | 2/1966 | Chiusoli |
| 3,344,046 A | 9/1967 | Neikam |
| 3,347,758 A | 10/1967 | Koehl, Jr. |
| 3,399,966 A | 9/1968 | Osamu Suzuki et al. |
| 3,401,100 A | 9/1968 | Macklin |
| 3,531,386 A | 9/1970 | Heredy |
| 3,560,354 A | 2/1971 | Young |
| 3,607,962 A | 9/1971 | Krekeler et al. |
| 3,636,159 A | 1/1972 | Solomon |
| 3,720,591 A | 3/1973 | Skarlos |
| 3,745,180 A | 7/1973 | Rennie |
| 3,764,492 A | 10/1973 | Baizer et al. |
| 3,779,875 A | 12/1973 | Michelet |
| 3,824,163 A | 7/1974 | Maget |
| 3,894,059 A | 7/1975 | Selvaratnam |
| 3,899,401 A | 8/1975 | Nohe et al. |
| 3,959,094 A | 5/1976 | Steinberg |
| 4,072,583 A | 2/1978 | Hallcher et al. |
| 4,088,682 A | 5/1978 | Jordan |
| 4,147,599 A | 4/1979 | O'Leary et al. |
| 4,160,816 A | 7/1979 | Williams et al. |
| 4,219,392 A | 8/1980 | Halmann |
| 4,253,921 A | 3/1981 | Baldwin et al. |
| 4,267,070 A | 5/1981 | Nefedov et al. |
| 4,299,981 A | 11/1981 | Leonard |
| 4,334,967 A | 6/1982 | Tedoradze et al. |
| 4,343,690 A | 8/1982 | de Nora |
| 4,381,978 A | 5/1983 | Gratzel et al. |
| 4,384,084 A | 5/1983 | Lohse et al. |
| 4,414,080 A | 11/1983 | Williams et al. |
| 4,421,613 A | 12/1983 | Goodridge et al. |
| 4,439,302 A | 3/1984 | Wrighton et al. |
| 4,450,055 A | 5/1984 | Stafford |
| 4,451,342 A | 5/1984 | Lichtin et al. |
| 4,460,443 A | 7/1984 | Somorjai et al. |
| 4,474,652 A | 10/1984 | Brown et al. |
| 4,476,003 A | 10/1984 | Frank et al. |
| 4,478,694 A | 10/1984 | Weinberg |
| 4,478,699 A | 10/1984 | Halmann et al. |
| 4,510,214 A | 4/1985 | Crouse et al. |
| 4,545,866 A | 10/1985 | De Nora et al. |
| 4,560,451 A | 12/1985 | Nielsen |
| 4,563,254 A | 1/1986 | Morduchowitz et al. |
| 4,589,963 A | 5/1986 | Cipriano et al. |
| 4,595,465 A | 6/1986 | Ang et al. |
| 4,608,132 A | 8/1986 | Sammells |
| 4,608,133 A | 8/1986 | Morduchowitz et al. |
| 4,609,440 A | 9/1986 | Frese, Jr. et al. |
| 4,609,441 A | 9/1986 | Frese, Jr. et al. |
| 4,609,451 A | 9/1986 | Sammells et al. |
| 4,619,743 A | 10/1986 | Cook |
| 4,620,906 A | 11/1986 | Ang |
| 4,661,422 A | 4/1987 | Marianowski et al. |
| 4,668,349 A | 5/1987 | Cuellar et al. |
| 4,673,473 A | 6/1987 | Ang et al. |
| 4,702,973 A | 10/1987 | Marianowski |
| 4,732,655 A | 3/1988 | Morduchowitz et al. |
| 4,756,807 A | 7/1988 | Meyer et al. |
| 4,776,171 A | 10/1988 | Perry, Jr. et al. |
| 4,793,904 A | 12/1988 | Mazanec et al. |
| 4,810,596 A | 3/1989 | Ludwig |
| 4,824,532 A | 4/1989 | Moingeon et al. |
| 4,845,252 A | 7/1989 | Schmidt et al. |
| 4,855,496 A | 8/1989 | Anderson et al. |
| 4,897,167 A | 1/1990 | Cook et al. |
| 4,902,828 A | 2/1990 | Wickenhaeuser et al. |
| 4,921,586 A | 5/1990 | Molter |
| 4,936,966 A | 6/1990 | Garnier et al. |
| 4,945,397 A | 7/1990 | Schuetz |
| 4,950,368 A | 8/1990 | Weinberg et al. |
| 4,959,131 A | 9/1990 | Cook et al. |
| 5,064,733 A | 11/1991 | Krist et al. |
| 5,084,148 A | 1/1992 | Kazcur et al. |
| 5,096,054 A | 3/1992 | Scherson |
| 5,106,465 A | 4/1992 | Kaczur et al. |
| 5,198,086 A | 3/1993 | Chlanda et al. |
| 5,198,311 A | 3/1993 | Nakazawa et al. |
| 5,246,551 A | 9/1993 | Pletcher et al. |
| 5,284,563 A | 2/1994 | Fujihira et al. |
| 5,290,404 A | 3/1994 | Toomey |
| 5,300,369 A | 4/1994 | Dietrich et al. |
| 5,294,319 A | 5/1994 | Kaczur et al. |
| 5,382,332 A | 1/1995 | Fujihira et al. |
| 5,443,804 A | 8/1995 | Parker et al. |
| 5,455,372 A | 10/1995 | Hirai et al. |
| 5,474,658 A | 12/1995 | Scharbert et al. |
| 5,514,492 A | 5/1996 | Marincic et al. |
| 5,536,856 A | 7/1996 | Harrison et al. |
| 5,587,083 A | 12/1996 | Twardowski |
| 5,763,662 A | 6/1998 | Ikariya et al. |
| 5,804,045 A | 9/1998 | Orillon et al. |
| 5,858,240 A | 1/1999 | Twardowski et al. |
| 5,928,806 A | 7/1999 | Olah et al. |
| 5,961,813 A | 10/1999 | Gestermann et al. |
| 6,001,500 A | 12/1999 | Bass et al. |
| 6,024,935 A | 2/2000 | Mills et al. |
| 6,137,005 A | 10/2000 | Honevik |
| 6,171,551 B1 | 1/2001 | Malchesky et al. |
| 6,187,465 B1 | 2/2001 | Galloway |
| 6,251,256 B1 | 6/2001 | Blay et al. |
| 6,270,649 B1 | 8/2001 | Zeikus et al. |
| 6,312,655 B1 | 11/2001 | Hesse et al. |
| 6,348,613 B2 | 2/2002 | Miyamoto et al. |
| 6,409,893 B1 | 6/2002 | Holzbock et al. |
| 6,492,047 B1 | 12/2002 | Peled et al. |
| 6,657,119 B2 | 12/2003 | Lindquist et al. |
| 6,755,947 B2 | 6/2004 | Schulze et al. |
| 6,777,571 B2 | 8/2004 | Chaturvedi et al. |
| 6,806,296 B2 | 10/2004 | Shiroto et al. |
| 6,881,320 B1 | 4/2005 | Krafton et al. |
| 6,887,728 B2 | 5/2005 | Miller et al. |
| 6,906,222 B2 | 6/2005 | Slany et al. |
| 6,936,143 B1 | 8/2005 | Graetzel et al. |
| 6,942,767 B1 | 9/2005 | Fazzina et al. |
| 6,949,178 B2 | 9/2005 | Tennakoon et al. |
| 7,037,414 B2 | 5/2006 | Fan |
| 7,052,587 B2 | 5/2006 | Gibson et al. |
| 7,094,329 B2 | 8/2006 | Saha et al. |
| 7,138,201 B2 | 11/2006 | Inoue et al. |
| 7,314,544 B2 | 1/2008 | Murphy et al. |
| 7,318,885 B2 | 1/2008 | Omasa |
| 7,338,590 B1 | 3/2008 | Shelnutt et al. |
| 7,361,256 B2 | 4/2008 | Henry et al. |
| 7,378,561 B2 | 5/2008 | Olah et al. |
| 7,704,369 B2 | 4/2010 | Olah et al. |
| 7,883,610 B2 | 2/2011 | Monzyk et al. |
| 8,227,127 B2 | 7/2012 | Little et al. |
| 8,277,631 B2 | 10/2012 | Eastman et al. |
| 8,313,634 B2 | 11/2012 | Bocarsly et al. |
| 8,444,844 B1 | 5/2013 | Teamey et al. |
| 8,562,811 B2 | 10/2013 | Sivasankar et al. |
| 8,663,447 B2 | 3/2014 | Bocarsly et al. |

(56) References Cited

U.S. PATENT DOCUMENTS

| | | |
|---|---|---|
| 8,721,866 B2 | 5/2014 | Sivasankar et al. |
| 9,090,976 B2 | 7/2015 | Bocarsly et al. |
| 2001/0001798 A1 | 5/2001 | Sharpless et al. |
| 2001/0026884 A1 | 10/2001 | Appleby et al. |
| 2002/0013477 A1 | 1/2002 | Km et al. |
| 2002/0122980 A1 | 9/2002 | Fleischer et al. |
| 2003/0029733 A1 | 2/2003 | Otsuka et al. |
| 2004/0006246 A1 | 1/2004 | Sherman et al. |
| 2004/0089540 A1 | 5/2004 | Van Heuveln et al. |
| 2004/0115489 A1 | 6/2004 | Goel |
| 2005/0011755 A1 | 1/2005 | Jovic et al. |
| 2005/0011765 A1 | 1/2005 | Omasa |
| 2005/0051439 A1 | 3/2005 | Jang |
| 2005/0139486 A1 | 6/2005 | Carson et al. |
| 2005/0245784 A1 | 11/2005 | Carson et al. |
| 2006/0102468 A1 | 5/2006 | Monzyk et al. |
| 2006/0235091 A1 | 10/2006 | Olah et al. |
| 2006/0243587 A1 | 11/2006 | Tulloch et al. |
| 2006/0269813 A1 | 11/2006 | Seabaugh et al. |
| 2007/0004023 A1 | 1/2007 | Trachtenberg et al. |
| 2007/0012577 A1 | 1/2007 | Bulan et al. |
| 2007/0045125 A1 | 3/2007 | Hartvigsen et al. |
| 2007/0054170 A1 | 3/2007 | Isenberg |
| 2007/0122705 A1 | 5/2007 | Paulsen et al. |
| 2007/0184309 A1 | 8/2007 | Gust, Jr. et al. |
| 2007/0224479 A1 | 9/2007 | Tadokoro et al. |
| 2007/0231619 A1 | 10/2007 | Strobel et al. |
| 2007/0240978 A1 | 10/2007 | Beckmann et al. |
| 2007/0254969 A1 | 11/2007 | Olah et al. |
| 2007/0282021 A1 | 12/2007 | Campbell |
| 2008/0011604 A1 | 1/2008 | Stevens et al. |
| 2008/0039538 A1 | 2/2008 | Olah et al. |
| 2008/0060947 A1 | 3/2008 | Kitsuka et al. |
| 2008/0072496 A1 | 3/2008 | Yogev et al. |
| 2008/0090132 A1 | 4/2008 | Ivanov et al. |
| 2008/0116080 A1 | 5/2008 | Lal et al. |
| 2008/0145721 A1 | 6/2008 | Shapiro et al. |
| 2008/0223727 A1 | 9/2008 | Oloman et al. |
| 2008/0245660 A1 | 10/2008 | Little et al. |
| 2008/0248350 A1 | 10/2008 | Little et al. |
| 2008/0283411 A1 | 11/2008 | Eastman et al. |
| 2008/0286643 A1 | 11/2008 | Iwasaki |
| 2008/0287555 A1 | 11/2008 | Hussain et al. |
| 2008/0296146 A1 | 12/2008 | Toulhoat et al. |
| 2009/0000956 A1 | 1/2009 | Weidner et al. |
| 2009/0014336 A1 | 1/2009 | Olah et al. |
| 2009/0030240 A1 | 1/2009 | Olah et al. |
| 2009/0038955 A1 | 2/2009 | Rau |
| 2009/0057161 A1 | 3/2009 | Aulich et al. |
| 2009/0061267 A1 | 3/2009 | Monzyk et al. |
| 2009/0062110 A1 | 3/2009 | Koshino et al. |
| 2009/0069452 A1 | 3/2009 | Robota |
| 2009/0134007 A1 | 5/2009 | Solis Herrera |
| 2009/0156867 A1 | 6/2009 | Van Kruchten |
| 2009/0277799 A1 | 11/2009 | Grimes |
| 2009/0308759 A1 | 12/2009 | Waycuilis |
| 2010/0051859 A1 | 3/2010 | House et al. |
| 2010/0061922 A1 | 3/2010 | Rauser et al. |
| 2010/0069600 A1 | 3/2010 | Morelle et al. |
| 2010/0084280 A1 | 4/2010 | Gilliam et al. |
| 2010/0130768 A1 | 5/2010 | Sato et al. |
| 2010/0140103 A1 | 6/2010 | Gilliam et al. |
| 2010/0147699 A1 | 6/2010 | Wachsman et al. |
| 2010/0150802 A1 | 6/2010 | Gilliam et al. |
| 2010/0180889 A1 | 7/2010 | Monzyk et al. |
| 2010/0187123 A1 | 7/2010 | Bocarsly et al. |
| 2010/0187125 A1 | 7/2010 | Sandoval et al. |
| 2010/0191010 A1 | 7/2010 | Bosman et al. |
| 2010/0193370 A1 | 8/2010 | Olah et al. |
| 2010/0196800 A1 | 8/2010 | Markoski et al. |
| 2010/0213046 A1 | 8/2010 | Grimes et al. |
| 2010/0248042 A1 | 9/2010 | Nakagawa et al. |
| 2010/0282614 A1 | 11/2010 | Detournay et al. |
| 2010/0305629 A1 | 12/2010 | Lund et al. |
| 2010/0307912 A1 | 12/2010 | Zommer |
| 2011/0014100 A1 | 1/2011 | Bara et al. |
| 2011/0024288 A1 | 2/2011 | Bhavaraju et al. |
| 2011/0083968 A1 | 4/2011 | Gilliam et al. |
| 2011/0114501 A1 | 5/2011 | Teamey et al. |
| 2011/0114502 A1 | 5/2011 | Cole et al. |
| 2011/0114503 A1 | 5/2011 | Sivasankar et al. |
| 2011/0114504 A1 | 5/2011 | Sivasankar et al. |
| 2011/0143224 A1 | 6/2011 | Rittmann et al. |
| 2011/0143929 A1 | 6/2011 | Sato et al. |
| 2011/0177398 A1 | 7/2011 | Affinito et al. |
| 2011/0186441 A1 | 8/2011 | LaFrancois et al. |
| 2011/0217226 A1 | 9/2011 | Mosa et al. |
| 2011/0226632 A1 | 9/2011 | Cole et al. |
| 2011/0237830 A1 | 9/2011 | Masel |
| 2011/0303551 A1 | 12/2011 | Gilliam et al. |
| 2011/0318617 A1 | 12/2011 | Kirchev et al. |
| 2012/0018311 A1 | 1/2012 | Yotsuhashi et al. |
| 2012/0043301 A1 | 2/2012 | Arvin et al. |
| 2012/0132537 A1 | 5/2012 | Sivasankar et al. |
| 2012/0132538 A1 | 5/2012 | Cole et al. |
| 2012/0199493 A1 | 8/2012 | Krafft et al. |
| 2012/0215034 A1 | 8/2012 | McFarland |
| 2012/0228147 A1 | 9/2012 | Sivasankar et al. |
| 2012/0277465 A1 | 11/2012 | Cole et al. |
| 2012/0292196 A1 | 11/2012 | Albrecht et al. |
| 2012/0295172 A1 | 11/2012 | Peled et al. |
| 2012/0298522 A1 | 11/2012 | Shipchandler et al. |
| 2012/0329657 A1 | 12/2012 | Eastman et al. |
| 2013/0062216 A1 | 3/2013 | Yotsuhashi et al. |
| 2013/0098772 A1 | 4/2013 | Bocarsly et al. |
| 2013/0105304 A1 | 5/2013 | Kaczur et al. |
| 2013/0105330 A1 | 5/2013 | Teamey et al. |
| 2013/0118907 A1 | 5/2013 | Deguchi et al. |
| 2013/0118909 A1 | 5/2013 | Kaczur et al. |
| 2013/0118911 A1 | 5/2013 | Sivasankar et al. |
| 2013/0134048 A1 | 5/2013 | Teamey et al. |
| 2013/0134049 A1 | 5/2013 | Teamey et al. |
| 2013/0137898 A1 | 5/2013 | Teamey et al. |
| 2013/0140187 A1 | 6/2013 | Teamey et al. |
| 2013/0180863 A1 | 7/2013 | Kaczur et al. |
| 2013/0180865 A1 | 7/2013 | Cole et al. |
| 2013/0186771 A1 | 7/2013 | Zhai et al. |
| 2013/0199937 A1 | 8/2013 | Cole et al. |

FOREIGN PATENT DOCUMENTS

| | | |
|---|---|---|
| CN | 101743343 A | 6/2010 |
| CN | 102190573 A | 9/2011 |
| DE | 1047765 A | 12/1958 |
| DE | 2301032 A | 7/1974 |
| EP | 0028430 A1 | 5/1981 |
| EP | 0111870 B1 | 12/1983 |
| EP | 0081982 B1 | 5/1985 |
| EP | 0277048 B1 | 3/1988 |
| EP | 0390157 B1 | 5/2000 |
| EP | 2329875 A1 | 6/2011 |
| FR | 853643 | 3/1940 |
| FR | 2780055 A1 | 12/1999 |
| GB | 1223452 A | 2/1971 |
| GB | 1285209 A | 8/1972 |
| JP | 48029721 | 4/1973 |
| JP | 50052010 | 5/1975 |
| JP | 53101311 | 4/1978 |
| JP | 62120489 A | 6/1987 |
| JP | 64-015388 | 1/1989 |
| JP | 07258877 A | 10/1995 |
| JP | 7-75784 | 10/1996 |
| JP | 7-118886 | 10/1996 |
| JP | 2000104190 | 4/2000 |
| JP | 2004533545 | 11/2004 |
| JP | 2004344720 A | 12/2004 |
| JP | 2006188370 A | 7/2006 |
| JP | 2007185096 A | 7/2007 |
| JP | 2009540130 | 11/2009 |
| JP | 2012516392 A | 7/2012 |
| KR | 20040009875 A | 1/2004 |
| WO | 1991/001947 A1 | 2/1991 |
| WO | WO 9724320 A1 | 7/1997 |
| WO | 1998050974 A1 | 11/1998 |

(56) References Cited

FOREIGN PATENT DOCUMENTS

| WO | WO9850974 A1 | 11/1998 |
|---|---|---|
| WO | WO 2000015586 A1 | 3/2000 |
| WO | WO0025380 A2 | 5/2000 |
| WO | WO02059987 A3 | 8/2002 |
| WO | 2003004727 A2 | 1/2003 |
| WO | WO 03004727 A2 | 1/2003 |
| WO | WO 200467673 A1 | 8/2004 |
| WO | 2006074335 A2 | 7/2006 |
| WO | 2007041872 A1 | 4/2007 |
| WO | WO 2007041872 A1 | 4/2007 |
| WO | WO2007041872 A1 | 4/2007 |
| WO | WO2007058608 A1 | 5/2007 |
| WO | 2007/091616 A1 | 8/2007 |
| WO | WO2007119260 A2 | 10/2007 |
| WO | 2007145586 A1 | 12/2007 |
| WO | WO2008016728 A2 | 2/2008 |
| WO | WO2008017838 A1 | 2/2008 |
| WO | WO2008124538 A1 | 10/2008 |
| WO | WO2009002566 A1 | 12/2008 |
| WO | 2009012154 A2 | 1/2009 |
| WO | 2009108327 A1 | 9/2009 |
| WO | WO2009145624 A1 | 12/2009 |
| WO | WO2010010252 A2 | 1/2010 |
| WO | WO2010042197 A1 | 4/2010 |
| WO | WO2010088524 A2 | 8/2010 |
| WO | WO2010138792 A1 | 12/2010 |
| WO | WO2011010109 A1 | 1/2011 |
| WO | 2011069008 | 6/2011 |
| WO | WO2011068743 A2 | 6/2011 |
| WO | 2011116236 A2 | 9/2011 |
| WO | WO2011120021 A1 | 9/2011 |
| WO | WO2011123907 A1 | 10/2011 |
| WO | WO2011133264 A1 | 10/2011 |
| WO | 2011160577 A1 | 12/2011 |
| WO | 2012015921 A1 | 2/2012 |
| WO | WO 2012046362 A1 | 4/2012 |
| WO | 2012118065 A1 | 9/2012 |
| WO | 2012166997 A2 | 12/2012 |

OTHER PUBLICATIONS

A. Sepulveda-Escribano et al., Platinum catalysts supported on carbon blacks with different surface chemical properties, Applied Catalysis A: General, 173, 1998, p. 247-257.

F.M. Al Kharafi et al., Electrochemical Oxidation of Sulfide Ions on Platinum Electrodes, Modern Applied Science, vol. 4, No. 3, Mar. 2010, pp. 2-11.

P.W.T. Lu, et al., Recent developments in the technology of sulphur dioxide depolarized electrolysis, Journal of Applied Electrochemistry, vol. 11, No. 3, May 1981, pp. 347-355.

Seshadri, Part I Electrocatalysis at modified semiconductor and metal electrodes; Part II Electrochemistry of nickel and cadmium hexacyanoferrates, Diss. Abstr. Int. B 1994, 54(12, Pt. 1), 6198, pp. 52-85.

Cuihong Yan et al., The Lastest Research Progress of Electrocatalytic Reduction Product of CO2, Chemical Engineer, Issue 7, p. 42-45, Jul. 25, 2010.

Yingchu Tao et al., Research Progress of Electrochemical Reduction of Carbon Dioxide, Chemistry, Issue 5, p. 272-277, Dec. 31, 2001, http://chemistrymag.org.

Wenying Wei et al., The research progress of CO2 electrocatalysis in water soluble medium, Progress in Chemistry Column, 26, Issue 2, 4 pages, Dec. 2008.

R.P.S. Chaplin and A.A. Wragg; Effects of Process Conditions and Electrode Material on Reaction Pathways for Carbon Dioxide Electroreduction with Particular Reference to Formate Formation; Journal of Applied Electrochemistry 33: pp. 1107-1123, 2003; © 2003 Kluwer Academic Publishers. Printed in the Netherlands.

Akahori, Iwanaga, Kato, Hamamoto, Ishii; New Electrochemical Process for CO2 Reduction to from Formic Acid from Combustion Flue Gases; Electrochemistry; vol. 4; pp. 266-270.

Ali, Sato, Mizukawa, Tsuge, Haga, Tanaka; Selective formation of HCO2- and C2O42—in electrochemical reduction of CO2 catalyzed by mono- and di-nuclear ruthenium complexes; Chemistry Communication; 1998; Received in Cambridge, UK, Oct. 13, 1997; 7/07363A; pp. 249-250.

Wang, Maeda, Thomas, Takanabe, Xin, Carlsson, Domen, Antonietti; A metal-free polymeric photocatalyst for hydrogen production from water under visible light; Nature Materials; Published Online Nov. 9, 2008; www.nature.com/naturematerials; pp. 1-5.

Aresta and Dibenedetto; Utilisation of CO2 as a Chemical Feedstock: Opportunities and Challenges; Dalton Transactions; 2007; pp. 2975-2992; © The Royal Society of Chemistry 2007.

B. Aurian-Blajeni, I. Taniguchi, and J. O'M. Bockris; Photoelectrochemical Reduction of Carbon Dioxide Using Polyaniline-Coated Silicon; J. Electroanal. Chem.; vol. 149; 1983; pp. 291-293; Elsevier Sequoia S.A., Lausanne, Printed in The Netherlands.

Azuma, Hashimoto, Hiramoto, Watanabe, Sakata; Electrochemical Reduction of Carbon Dioxide on Various Metal Electrodes in Low-Temperature Aqueous KHCO3 Media; J. Electrochem. Soc., vol. 137, No. 6, Jun. 1990 © The Electrochemical Society, Inc.

Bandi and Kuhne; Electrochemical Reduction of Carbon Dioxide in Water: Analysis of Reaction Mechanism on Ruthenium-Titanium-Oxide; J. Electrochem. Soc., vol. 139, No. 6, Jun. 1992 © The Electrochemical Society, Inc.

Beley, Collin, Sauvage, Petit, Chartier; Photoassisted Electro-Reduction of CO2 on p-GaAs In the Presence of Ni Cyclam; J. Electroanal. Chem. vol. 206, 1986, pp. 333-339, Elsevier Sequoia S.A., Lausanne, Printed in The Netherlands.

Benson, Kubiak, Sathrum, and Smieja; Electrocatalytic and homogeneous approaches to conversion of CO2 to liquid fuels; Chem. Soc. Rev., 2009, vol. 38, pp. 89-99, © The Royal Society of Chemistry 2009.

Taniguchi, Adrian-Blajeni, and Bockris; The Mediation of the Photoelectrochemical Reduction of Carbon Dioxide by Ammonium Ions; J. Electroanal. Chem., vol. 161, 1984, pp. 385-388, Elsevier Sequoia S.A., Lausanne—Printed in The Netherlands.

Bockris and Wass; The Photoelectrocatalytic Reduction of Carbon Dioxide; J. Electrochem. Soc., vol. 136, No. 9, Sep. 1989, pp. 2521-2528, © The Electrochemical Society, Inc.

Carlos R. Cabrera and Hector D. Abruna; Electrocatalysis of CO2 Reduction at Surface Modified Metallic and Semiconducting Electrodes; J. Electroanal. Chem. vol. 209, 1986, pp. 101-107, Elesevier Sequoia S.A., Lausanne—Printed in The Netherlands, © 1986 Elsevier Sequoia S.A.

D. Canfield and K.W. Frese, Jr.; Reduction of Carbon Dioxide to Methanol on n- and p-GaAs and p-InP. Effect of Crystal Face, Electrolyte and Current Density; Journal of the Electrochemical Society; Aug. 1983; pp. 1772-1773.

Huang, Lu, Zhao, Li, and Wang; The Catalytic Role of N-Heterocyclic Carbene in a Metal-Free Conversion of Carbon Dioxide into Methanol: A Computational Mechanism Study; J. Am. Chem. Soc. 2010, vol. 132, pp. 12388-12396, © 2010 American Chemical Society.

Arakawa, et al., Catalysis Research of Relevance to Carbon Management: Progress, Challenges, and Opportunities; Chem. Rev. 2001, vol. 101, pp. 953-996.

Cheng, Blaine, Hill, and Mann; Electrochemical and IR Spectroelectrochemical Studies of the Electrocatalytic Reduction of Carbon Dioxide by [Ir2(dimen)4]2+ (dimen=1,8-Diisocyanomenthane), Inorg. Chem. 1996, vol. 35, pp. 7704-7708, © 1996 American Chemical Society.

Stephen K. Ritter; What Can We Do With Carbon Dioxide?, Chemical & Engineering News, Apr. 30, 2007, vol. 85, No. 18, pp. 11-17, http://pubs.acs.org/cen/coverstory/85/8518cover.html.

J. Beck, R. Johnson, and T. Naya; Electrochemical Conversion of Carbon Dioxide to Hydrocarbon Fuels, EME 580 Spring 2010, pp. 1-42.

Aydin and Koleli, Electrochemical reduction of CO2 on a polyaniline electrode under ambient conditions and at high pressure in methanol, Journal of Electroanalytical Chemistry vol. 535 (2002) pp. 107-112, www.elsevier.com/locate/jelechem.

(56) References Cited

OTHER PUBLICATIONS

Lee, Kwon, Machunda, and Lee; Electrocatalytic Recycling of CO2 and Small Organic Molecules; Chem. Asian J. 2009, vol. 4, pp. 1516-1523, © 2009 Wiley-VCH Verlag GmbH&Co. KGaA, Weinheim.
Etsuko Fujita, Photochemical CO2 Reduction: Current Status and Future Prospects, American Chemical Society's New York Section, Jan. 15, 2011, pp. 1-29.
Toshio Tanaka, Molecular Orbital Studies on the Two-Electron Reduction of Carbon Dioxide to Give Formate Anion, Memiors of Fukui University of Technology, vol. 23, Part 1, 1993, pp. 223-230.
A. Bewick and G.P. Greener, The Electroreduction of CO2 to Glycollate on a Lead Cathode, Tetrahedron Letters No. 5, pp. 391-394, 1970, Pergamon Press, Printed in Great Britain.
Centi, Perathoner, Wine, and Gangeri, Electrocatalytic conversion of CO2 to long carbon-chain hydrocarbons, Green Chem., 2007, vol. 9, pp. 671-678, © The Royal Society of Chemistry 2007.
A. Bewick and G.P. Greener, The Electroreduction of CO2 to Malate on a Mercury Cathode, Tetrahedron Letters No. 53, pp. 4623-4626, 1969, Pergamon Press, Printed in Great Britain.
Eggins, Brown, McNeill, and Grimshaw, Carbon Dioxide Fixation by Electrochemical Reduction in Water to Oxalate and Glyoxylate, Tetrahedron Letters vol. 29, No. 8, pp. 945-948, 1988, Pergamon Journals Ltd., Printed in Great Britain.
Cook, MacDuff, and Sammells; High Rate Gas Phase CO2 Reduction to Ethylene and Methane Using Gas Diffusion Electrodes, J. Electrochem. Soc., vol. 137, No. 2, pp. 607-608, Feb. 1990, © The Electrochemical Society, Inc.
Daube, Harrison, Mallouk, Ricco, Chao, Wrighton, Hendrickson, and Drube; Electrode-Confined Catalyst Systems for Use in Optical-to-Chemical Energy Conversion; Journal of Photochemistry, vol. 29, 1985, pp. 71-88.
Dewulf, Jin, and Bard; Electrochemical and Surface Studies of Carbon Dioxide Reduction to Methane and Ethylene at Copper Electrodes in Aqueous Solutions; J. Electrochem. Soc., vol. 136, No. 6, Jun. 1989, pp. 1686-1691, © The Electrochemical Society, Inc.
J. Augustynski, P. Kedzierzawski, and B. Jermann, Electrochemical Reduction of CO2 at Metallic Electrodes, Studies in Surface Science and Catalysis, vol. 114, pp. 107-116, © 1998 Elsevier Science B.V.
Sung-Woo Lee, Jea-Keun Lee, Kyoung-Hag Lee, and Jun-Heok Lim, Electrochemical reduction of CO and H2 from carbon dioxide in aqua-solution, Current Applied Physics, vol. 10, 2010, pp. S51-S54.
Andrew P. Abbott and Christopher A. Eardley, Electrochemical Reduction of CO2 in a Mixed Supercritical Fluid, J. Phys. Chem. B, 2000, vol. 104, pp. 775-779.
Matthew R. Hudson, Electrochemical Reduction of Carbon Dioxide, Dec. 9, 2005, pp. 1-15.
S. Kapusta and N. Hackerman, The Electroreduction of Carbon Dioxide and Formic Acid on Tin and Indium Electrodes, J. Electrochem. Soc.: Electrochemical Science and Technology, Mar. 1983, pp. 607-613.
M Aulice Scibioh and B Viswanathan, Electrochemical Reduction of Carbon Dioxide: A Status Report, Proc Indian Natn Sci Acad, vol. 70, A, No. 3, May 2004, pp. 1-56.
N. L. Weinberg, D. J. Mazur, Electrochemical hydrodimerization of formaldehyde to ethylene glycol, Journal of Applied Electrochemistry, vol. 21, 1991, pp. 895-901.
R.P.S. Chaplin and A.A. Wragg, Effects of process conditions and electrode material on reaction pathways for carbon dioxide electroreduction with particular reference to formate formation, Journal of Applied Electrochemistry vol. 33, pp. 1107-1123, 2003, © 2003 Kluwer Academic Publishers. Printed in the Netherlands.
M.N. Mahmood, D. Masheder, and C.J. Harty, Use of gas-diffusion electrodes for high-rate electrochemical reduction of carbon dioxide. I. Reduction at lead, indium- and tin-impregnated electrodes, Journal of Applied Electrochemistry, vol. 17, 1987, pp. 1159-1170.
Summers, Leach, and Frese, The Electrochemical Reduction of Aqueous Carbon Dioxide to Methanol at Molybdenum Electrodes with Low Overpotentials, J. Electroanal. Chem., vol. 205, 1986, pp. 219-232, Elseiver Sequoia S.A., Lausanne—Printed in The Netherlands.
Frese and Leach, Electrochemical Reduction of Carbon Dioxide to Methane, Methanol, and CO on Ru Electrodes, Journal of the Electrochemical Society, Jan. 1985, pp. 259-260.
Frese and Canfield, Reduction of CO2 on n-GaAs Electrodes and Selective Methanol Synthesis, J. Electrochem. Soc.: Electrochemical Science and Technology, vol. 131, No. 11, Nov. 1984, pp. 2518-2522.
Shibata, Yoshida, and Furuya, Electrochemical Synthesis of Urea at Gas-Diffusion Electrodes, J. Electrochem. Soc., vol. 145, No. 2, Feb. 1998, © The Electrochemical Society, Inc., pp. 595-600.
Shibata and Furuya, Simultaneous reduction of carbon dioxide and nitrate ions at gas-diffusion electrodes with various metallophthalocyanine catalysts, Electrochimica Acta 48, 2003, pp. 3953-3958.
M. Gattrell, N. Gupta, and A. Co, A Review of the aqueous electrochemical reduction of CO2 to hydrocarbons at copper, Journal of Electroanalytical Chemistry, vol. 594, 2006, pp. 1-19.
Mahmood, Masheder, and Harty; Use of Gas-Diffusion Electrodes for High-Rate Electrochemical Reduction of Carbon Dioxide. II. Reduction at Metal Phthalocyanine-impregnated Electrodes; Journal of Applied Electrochemistry, vol. 17, 1987, pp. 1223-1227.
Gennaro, Isse, Saveant, Severin, and Vianello; Homogeneous Electron Transfer Catalysis of the Electrochemical Reduction of Carbon Dioxide. Do Aromatic Anion Radicals React in an Outer-Sphere Manner?; J. Am. Chem. Soc., 1996, vol. 118, pp. 7190-7196.
J. Giner, Electrochemical Reduction of CO2 on Platinum Electrodes in Acid Solutions, Electrochimica Acta, 1963, vol. 8, pp. 857-865, Pregamon Press Ltd., Printed in Northern Ireland.
John Leonard Haan, Electrochemistry of Formic Acid and Carbon Dioxide on Metal Electrodes with Applications to Fuel Cells and Carbon Dioxide Conversion Devices, 2010, pp. 1-205.
M. Halmann, Photoelectrochemical reduction of aqueous carbon dioxide on p-type gallium phosphide in liquid junction solar cells, Nature, vol. 275, Sep. 14, 1978, pp. 115-116.
H. Ezaki, M. Morinaga, and S. Watanabe, Hydrogen Overpotential for Transition Metals and Alloys, and its Interpretation Using an Electronic Model, Electrochimica Acta, vol. 38, No. 4, 1993, pp. 557-564, Pergamon Press Ltd., Printed in Great Britain.
K.S. Udupa, G.S. Subramanian, and H.V.K. Udupa, The Electrolytic Reduction of Carbon Dioxide to Formic Acid, Electrochimica Acta, 1971, vol. 16, pp. 1593-1598, Pergamon Press., Printed in Northern Ireland.
Ougitani, Aizawa, Sonoyama, and Sakata; Temperature Dependence of the Probability of Chain Growth for Hydrocarbon Formation by Electrochemical Reduction of CO2, Bull. Chem. Soc. Jpn., vol. 74, pp. 2119-2122, 2001.
Furuya, Yamazaki, and Shibata; High performance Ru—Pd catalysts for CO2 reduction at gas-diffusion electrodes, Journal of Electroanalytical Chemistry, vol. 431, 1997, pp. 39-41.
R. Hinogami, Y. Nakamura, S. Yae, and Y. Nakato; An Approach to Ideal Semiconductor Electrodes for Efficient Photoelectrochemical Reduction of Carbon Dioxide by Modification with Small Metal Particles, J. Phys. Chem. B, 1998, vol. 102, pp. 974-980.
Reda, Plugge, Abram, and Hirst; Reversible interconversion of carbon dioxide and formate by an electroactive enzyme, PNAS, Aug. 5, 2008, vol. 105, No. 31, pp. 10654-10658, www.pnas.org/cgi/doi/10.1073pnas.0801290105.
Y. Hori, Electrochemical CO2 Reduction on Metal Electrodes, Modern Aspects of Electrochemistry, No. 42, edited by C. Vayenas et al., Springer, New York, 2008, pp. 89-189.
Hori, Yoshio; Suzuki, Shin, Cathodic Reduction of Carbon Dioxide for Energy Storage, Journal of the Research Institute for Catalysis Hokkaido University, 30(2): 81-88, 1983-02, http://hdl.handle.net/2115/25131.
Hori, Wakebe, Tsukamoto, and Koga; Electrocatalytic Process of CO Selectivity in Electrochemical Reduction of CO2 at Metal Electrodes in Aqueous Media, Electrochimica Acta, vol. 39, No. 11/12, pp. 1833-1839, 1994, Copyright 1994 Elsevier Science Ltd.,Pergamon, Printed in Great Britain.

(56) References Cited

OTHER PUBLICATIONS

Hori, Kikuchi, and Suzuki; Production of CO and CH4 in Electrochemical Reduction of CO2 at Metal Electrodes in Aqueous Hydrogencarbonate Solution; Chemistry Letters, 1985, pp. 1695-1698, Copyright 1985 The Chemical Society of Japan.
Hori, Kikuchi, Murata, and Suzuki; Production of Methane and Ethylene in Electrochemical Reduction of Carbon Dioxide at Copper Electrode in Aqueous Hydrogencarbonate Solution; Chemistry Letters, 1986, pp. 897-898, Copyright 1986 The Chemical Society of Japan.
Hoshi, Suzuki, and Hori; Step Density Dependence of CO2 Reduction Rate on Pt(S)-[n(111)×(111)] Single Crystal Electrodes, Electrochimica Acta, vol. 41, No. 10, pp. 1617-1653, 1996, Copyright 1996 Elsevier Science Ltd. Printed in Great Britain.
Hoshi, Suzuki, and Hori; Catalytic Activity of CO2 Reduction on Pt Single-Crystal Electrodes: Pt(S)-[n(111)×(111)], Pt(S)-[n(111)×(100)], and Pt(S)-[n(100)×(111)], J. Phys. Chem. B, 1997, vol. 101, pp. 8520-8524.
Ikeda, Saito, Yoshida, Noda, Maeda, and Ito; Photoelectrochemical reduction products of carbon dioxide at metal coated p-GaP photocathodes in non-aqueous electrolytes, J. Electroanal. Chem., 260 (1989) pp. 335-345, Elsevier Sequoia S.A., Lausanne—Printed in The Netherlands.
Noda, Ikeda, Oda, Imai, Maeda, and Ito; Electrochemical Reduction of Carbon Dioxide at Various Metal Electrodes in Aqueous Potassium Hydrogen Carbonate Solution, Bull. Chem. Soc. Jpn., 63, pp. 2459-2462, 1990, Copyright 1990 The Chemical Society of Japan.
S.R. Narayanan, B. Haines, J. Soler, and T.I. Valdez; Electrochemical Conversion of Carbon Dioxide to Formate in Alkaline Polymer Electrolyte Membrane Cells, Journal of The Electrochemical Society, 158 (2) A167-A173 (2011).
Tooru Inoue, Photoelectrocatalytic reduction of carbon dioxide in aqueous suspensions of semiconductor powders, Nature, vol. 277, Feb. 22, 1979, pp. 637-638.
B. Jermann and J. Augustynski, Long-Term Activation of the Copper Cathode in the Course of CO2 Reduction, Electrochimica Acta, vol. 39, No. 11/12, pp. 1891-1896, 1994, Elsevier Science Ltd., Printed in Great Britain.
Jitaru, Lowy, M. Toma, B.C. Toma, and L. Oniciu; Electrochemical reduction of carbon dioxide on flat metallic cathodes; Journal of Applied Electrochemistry 27 (1997) 875-889, Reviews in Applied Electrochemistry No. 45.
Maria Jitaru, Electrochemical Carbon Dioxide Reduction—Fundamental and Applied Topics (Review), Journal of the University of Chemical Technology and Metallurgy, 42, 4, 2007, 333-344.
Kaneco, Katsumata, Suzuki, and Ohta; Photoelectrocatalytic reduction of CO2 in LiOH/methanol at metal-modified p-InP electrodes, Applied Catalysis B: Environmental 64 (2006) 139-145.
J.J. Kim, D.P. Summers, and K.W. Frese, Jr; Reduction of CO2 and CO to Methane on Cu Foil Electrodes, J. Electroanal. Chem., 245 (1988) 223-244, Elsevier Sequoia S.A., Lausanne—Printed in The Netherlands.
Osamu Koga and Yoshio Hori, Reduction of Adsorbed CO on a Ni Electrode in Connection With the Electrochemical Reduction of CO2, Electrochimica Acta, vol. 38, No. 10, pp. 1391-1394,1993, Printed in Great Britain.
Breedlove, Ferrence, Washington, and Kubiak; A photoelectrochemical approach to splitting carbon dioxide for a manned mission to Mars, Materials and Design 22 (2001) 577-584, © 2001 Elsevier Science Ltd.
Simon-Manso and Kubiak, Dinuclear Nickel Complexes as Catalysts for Electrochemical Reduction of Carbon Dioxide, Organometallics 2005, 24, pp. 96-102, © 2005 American Chemical Society.
Kushi, Nagao, Nishioka, Isobe, and Tanaka; Remarkable Decrease in Overpotential of Oxalate Formation in Electrochemical C02 Reduction by a Metal-Sulfide Cluster, J. Chem. Soc., Chem. Commun., 1995, pp. 1223-1224.
Kuwabata, Nishida, Tsuda, Inoue, and Yoneyama; Photochemical Reduction of Carbon Dioxide to Methanol Using ZnS Microcrystallite as a Photocatalyst in the Presence of Methanol Dehydrogenase, J. Electrochem. Soc., vol. 141, No. 6, pp. 1498-1503, Jun. 1994, © The Electrochemical Society, Inc.
Hori, Kikuchi, and Suzuki; Production of CO and CH4 in Electrochemical Reduction of CO2 at Metal Electrodes in Aqueous Hydrogencarbonate Solution; Chemistry Letters, pp. 1695-1698, 1985. (C) 1985 The Chemical Society of Japan.
Jitaru, Lowy, M. Toma, B.C. Toma, Oniciu; Electrochemical reduction of carbon dioxide on flat metallic cathodes; Journal of Applied Electrochemistry 27 (1997) pp. 875-889, Reviews in Applied Electrochemistry No. 45.
Kaneco, Iwao, Iiba, Itoh, Ohta, and Mizuno; Electrochemical Reduction of Carbon Dioxide on an Indium Wire in a KOH/Methanol-Based Electrolyte at Ambient Temperature and Pressure; Environmental Engineering Science; vol. 16, No. 2, 1999, pp. 131-138.
Todoroki, Hara, Kudo, and Sakata; Electrochemical reduction of high pressure CO2 at Pb, Hg and in electrodes in an aqueous KHCO3 solution; Journal of Electroanalytical Chemistry 394 (1995) 199-203.
R.P.S. Chaplin and A.A. Wragg, Effects of process conditions and electrode material on reaction pathways for carbon dioxide electroreduction with particular reference to formate formation, Journal of Applied Electrochemistry 33: 1107-1123, 2003, Copyright 2003 Kluwer Academic Publishers. Printed in the Netherlands.
Kapusta and Hackerman; The Electroreduction of Carbon Dioxide and Formic Acid on Tin and Indium Electrodes, J. Electrochem. Doc.: Electrochemical Science and Technology, vol. 130, No. 3 Mar. 1983, pp. 607-613.
M. N. Mahmood, D. Masheder, and C. J. Harty; Use of gas-diffusion electrodes for high-rate electrochemical reduction of carbon dioxide. I. Reduction at lead, indium- and tin-impregnated electrodes; Journal of Applied Electrochemistry 17 (1987) 1159-1170.
Yoshio Hori, Hidetoshi Wakebe, Toshio Tsukamoto and Osamu Koga; Electrocatalytic Process of CO Selectivity in Electrochemical Reductionof CO2 at Metal Electrodes in Aqueous Media; Electrochimica Acta, vol. 39, No. 11/12, pp. 1833-1839, 1994, Copyright 1994 Elsevier Science Ltd., Printed in Great Britain.
Noda, Ikeda, Oda, Imai, Maeda, and Ito; Electrochemical Reduction of Carbon Dioxide at Various Metal Electrodes in Aqueous Potassium Hydrogen Carbonate Solution; Bull. Chem. Soc. Jpn., 63, 2459-2462, 1990, Copyright 1990 The Chemical Society of Japan.
Azuma, Hashimoto, Hiramoto, Watanbe, and Sakata; Carbon dioxide reduction at low temperature on various metal electrodes; J. Electroanal. Chem., 260 (1989) 441-445, Elsevier Sequoia S.A., Lausanne—Printed in The Netherlands.
Vassiliev, Bagotzky, Khazova, and Mayorova; Electroreduction of Carbon Dioxide, Part II. The Mechanism of Reduction in Aprotic Solvents, J. Electroanal. Chem. 189 (1985) 295-309, Elsevier Sequoia S.A., Lausanne—Printed in The Netherlands.
Vassiliev, Bagotzky, Khazova, and Mayorova; Electroreduction of Carbon Dioxide, Part I. The Mechanism and Kinetics of Electroreduction of CO2 in Aqueous Solutions on Metals with High and Moderate Hydrogen Overvoltages, J. Electroanal. Chem. 189 (1985) 271-294, Elsevier Sequoia S.A., Lausanne—Printed in The Netherlands.
Ikeda, Takagi, and Ito; Selective Formation of Formic Acid, Oxalic Acid, and Carbon Monoxide by Electrochemical Reduction of Carbon Dioxide, Bull. Chem. Soc. Jpn., 60, 2517-2522.
Shibata, Yoshida, and Furuya; Electrochemical Synthesis of Urea at Gas-Diffusion Electrodes, IV. Simultaneous Reduction of Carbon Dioxide and Nitrate Ions with Various Metal Catalysts; J. Electrochem. Soc., vol. 145, No. 7, Jul. 1998 The Electrochemical Society, Inc., pp. 2348-2353.
F. Richard Keene, Electrochemical and Electrocatalytic Reactions of Carbon Dioxide—Chapter 1: Thermodynamic, Kinetic, and Product Considerations in Carbon Dioxide Reactivity, Elsevier, Amsterdam, 1993, pp. 1-17.
Sammells and Cook, Electrochemical and Electrocatalytic Reactions of Carbon Dioxide—Chapter 7: Electrocatalysis and Novel Electrodes for High Rate CO2 Reduction Under Ambient Conditions, Elsevier, Amsterdam, 1993, pp. 217-262.
W.W. Frese, Jr., Electrochemical and Electrocatalytic Reactions of Carbon Dioxide—Chapter 6: Electrochemical Reduction of CO2 at Solid Electrodes, Elsevier, Amsterdam, 1993, pp. 145-215.

(56) References Cited

OTHER PUBLICATIONS

Halmann and Steinberg, Greenhouse gas carbon dioxide mitigation: science and technology—Chapter 11: Photochemical and Radiation-Induced Activation of CO2 in Homogeneous Media, CRC Press, 1999, pp. 391-410.
Halmann and Steinberg, Greenhouse gas carbon dioxide mitigation: science and technology—Chapter 12: Electrochemical Reduction of CO2, CRC Press, 1999, pp. 411-515.
Halmann and Steinberg, Greenhouse gas carbon dioxide mitigation: science and technology—Chapter 13: Photoelectrochemical Reduction of CO2, CRC Press, 1999, pp. 517-527.
Colin Oloman and Hui Li, Electrochemical Processing of Carbon Dioxide, ChemSusChem 2008, 1, 385-391, Copyright 2008 Wiley-VCH Verlag GmbH& Co. KGaA, Weinheim, www.chemsuschem.org.
Hui Li and Colin Oloman, Development of a continuous reactor for the electro-reduction of carbon dioxide to formate—Part 1: Process variables, Journal of Applied Electrochemistry (2006) 36:1105-1115, Copyright Springer 2006.
Hui Li and Colin Oloman, Development of a continuous reactor for the electro-reduction of carbon dioxide to formate—Part 2: Scale-up, J Appl Electrochem (2007) 37:1107-1117.
Hui Li and Colin Oloman, The electro-reduction of carbon dioxide in a continuous reactor, Journal of Applied Electrochemistry (2005) 35:955-965, Copyright Springer 2005.
PCT International Search Report dated Dec. 13, 2011, PCT/US11/45515, 2 pages.
Andrew P. Doherty, Electrochemical reduction of butraldehyde in the presence of CO2, Electrochimica Acta 47 (2002) 2963-2967, Copyright 2002 Elsevier Science Ltd.
Seshadri, Lin, and Bocarsly; A new homogeneous electrocatalyst for the reduction of carbon dioxide to methanol at low overpotential; Journal of Electroanalytical Chemistry, 372 (1994) 145-150.
PCT International Search Report dated Dec. 15, 2011, PCT/US11/45521, 2 pages.
Fan et al., Semiconductor Electrodes. 27. The p- and n-GaAs-N,N?—Dimet h yl-4,4'-bipyridinium System. Enhancement of Hydrogen Evolution on p-GaAs and Stabilization of n-GaAs Electrodes, Journal of the American Chemical Society, vol. 102, Feb. 27, 1980, pp. 1488-1492.
PCT International Search Report dated Jun. 23, 2010, PCT/US10/22594, 2 pages.
Emily Barton Cole and Andrew B. Bocarsly, Carbon Dioxide as Chemical Feedstock, Chapter 11—Photochemical, Electrochemical, and Photoelectrochemical Reduction of Carbon Dioxide, Copyright 2010 Wiley-VCH Verlag GmbH & Co. KGaA, Weinheim, 26 pages.
Barton Cole, Lakkaraju, Rampulla, Morris, Abelev, and Bocarsly; Using a One-Electron Shuttle for the Multielectron Reduction of CO2 to Methanol: Kinetic, Mechanistic, and Structural Insights; Mar. 29, 2010, 13 pages.
Morris, McGibbon, and Bocarsly; Electrocatalytic Carbon Dioxide Activation: The Rate-Determining Step of Pyridinium-Catalyzed CO2 Reduction; ChemSusChem 2011, 4, 191-196, Copyright 2011 Wiley-VCH Verlag GmbH& Co. KGaA, Weinheim.
Emily Barton Cole, Pyridinium-Catalyzed Electrochemical and Photoelectrochemical Conversion of CO2 to Fuels: A Dissertation Presented to the Faculty of Princeton University in Candidacy for the Degree of Doctor of Philosophy, Nov. 2009, pp. 1-141.
Barton, Rampulla, and Bocarsly; Selective Solar-Driven Reduction of CO2 to Methanol Using a Catalyzed p-GaP Based Photoelectrochemical Cell; Oct. 3, 2007, 3 pages.
Mostafa Hossain, Nagaoka, and Ogura; Palladium and cobalt complexes of substituted quinoline, bipyridine and phenanthroline as catalysts for electrochemical reduction of carbon dioxide; Electrochimica Acta, vol. 42, No. 16, pp. 2577-2585, 1997.
Keene, Creutz, and Sutin; Reduction of Carbon Dioxide by Tris(2,2'-Bipyridine)Cobalt(I), Coordination Chemistry Reviews, 64 (1995) 247-260, Elsevier Science Publishers B.V., Amsterdam—Printed in The Netherlands.
Aurian-Blajeni, Halmann, and Manassen; Electrochemical Measurements on the Photoelectrochemical Reduction of Aqueous Carbon Dioxide on p-Gallium Phosphide and p-Gallium Arsenide Semiconductor Electrodes, Solar Energy Materials 8 (1983) 425-440, North-Holland Publishing Company.
Tan, Zou, and Hu; Photocatalytic reduction of carbon dioxide into gaseous hydrocarbon using TiO2 pellets; Catalysis Today 115 (2006) 269-273.
Bandi and Kuhne, Electrochemical Reduction of Carbon Dioxide in Water: Analysis of Reaction Mechanism on Ruthenium-Titanium-Oxide, J. Electrochem. Soc., vol. 139, No. 6, Jun. 1992 (C) The Electrochemical Society, Inc., pp. 1605-1610.
B. Beden, A. Bewick and C. Lamy, A Study by Electrochemically Modulated Infrared Reflectance Spectroscopy of the Electrosorption of Formic Acid at a Platinum Electrode, J. Electroanal. Chem., 148 (1983) 147-160, Elsevier Sequoia S.A., Lausanne—Printed in The Netherlands.
Bell and Evans, Kinetics of the Dehydration of Methylene Glycol in Aqueous Solution, Proceedings of the Royal Society of London, Series A, Mathematical and Physical Sciences, vol. 291, No. 1426 (Apr. 26, 1966), pp. 297-323.
Bian, Sumi, Furue, Sato, Kolke, and Ishitani; A Novel Tripodal Ligand, Tris[(4'-methyl-2,2'-bipyridyl-4-yl)-methyl]carbinol and Its Trinuclear RuII/ReI Mixed-Metal Complexes: Synthesis, Emission Properties, and Photocatalytic CO2 Reduction; Inorganic Chemistry, vol. 47, No. 23, 2008, pp. 10801-10803.
T. Bundgaard, H. J. Jakobsen, and E. J. Rahkamaa; A High-Resolution Investigation of Proton Coupled and Decoupled 13C FT NMR Spectra of 15N-Pyrrole; Journal of Magnetic Resonance 19,345-356 (1975).
D. Canfield and K. W. Frese, Jr, Reduction of Carbon Dioxide to Methanol on n- and p-GaAs and p-InP. Effect of Crystal Face, Electrolyte and Current Density, Journal of the Electrochemical Society, vol. 130, No. 8, Aug. 1983, pp. 1772-1773.
Arakawa, et al., Catalysis Research of Relevance to Carbon Management: Progress, Challenges, and Opportunities, Chem. Rev. 2001, 101, 953-996.
Chang, Ho, and Weaver; Applications of real-time infrared spectroscopy to electrocatalysis at bimetallic surfaces, I. Electrooxidation of formic acid and methanol on bismuth-modified Pt(111) and Pt(100), Surface Science 265 (1992) 81-94.
S. Clarke and J. A. Harrison, The Reduction of Formaldehyde, Electroanalytical Chemistry and Interfacial Electrochemistry, J. Electroanal. Chem., 36 (1972), pp. 109-115, Elsevier Sequoia S.A., Lausanne Printed in The Netherlands.
Li, Markley, Mohan, Rodriguez-Santiago, Thompson, and Van Niekerk; Utilization of Carbon Dioxide From Coal-Fired Power Plant for the Production of Value-Added Products; Apr. 27, 2006, 109 pages.
Stephen K. Ritter, What Can We Do With Carbon Dioxide? Scientists are trying to find ways to convert the plentiful greenhouse gas into fuels and other value-added products, Chemical & Engineering News, Apr. 30, 2007, vol. 85, No. 18, pp. 11-17, http://pubs.acs.org/cen/coverstory/85/8518cover.html.
Toshio Tanaka, Molecular Orbital Studies on the Two-Electron Reduction of Carbon Dioxide to Give Formate Anion, Memoirs of Fukui University of Technology, vol. 23, Part 1, 1993, pp. 223-230.
Columbia, Crabtree, and Thiel; The Temperature and Coverage Dependences of Adsorbed Formic Acid and Its Conversion to Formate on Pt(111), J. Am. Chem. Soc., vol. 114, No. 4, 1992, pp. 1231-1237.
Brian R. Eggins and Joanne McNeill, Voltammetry of Carbon Dioxide Part I. A General Survey of Voltammetry at Different Electrode Materials in Different Solvents, J. Electroanal. Chem., 148 (1983) 17-24, Elsevier Sequoia S.A., Lausanne—Printed in The Netherlands.
Varghese, Paulose, Latempa, and Grimes; High-Rate Solar Photocatalytic Conversion of CO2 and Water Vapor to Hydrocarbon Fuels; Nano Letters, 2009, vol. 9, No. 2, pp. 731-737.
Han, Chu, Kim, Song, and Kim; Photoelectron spectroscopy and ab initio study of mixed cluster anions of [(CO2l-3(Pyridine)1-6:

(56) References Cited

OTHER PUBLICATIONS

Formation of a covalently bonded anion core of (C5H5N—CO2), Journal of Chemical Physics, vol. 113, No. 2, Jul. 8, 2000, pp. 596-601.

Heinze, Hempel, and Beckmann; Multielectron Storage and Photo-Induced Electron Transfer in Oligonuclear Complexes Containing Ruthenium(II) Terpyridine and Ferrocene Building Blocks, Eur. J. Inorg. Chem. 2006, 2040-2050.

Lin and Frei, Bimetallic redox sites for photochemical CO2 splitting in mesoporous silicate sieve, C. R. Chimie 9 (2006) 207-213.

Heyduk, MacIntosh, and Nocera; Four-Electron Photochemistry of Dirhodium Fluorophosphine Compounds, J. Am. Chem. Soc. 1999, 121, 5023-5032.

Witham, Huang, Tsung, Kuhn, Somorjai, and Toste; Converting homogeneous to heterogeneous in electrophilic catalysis using monodisperse metal nanoparticles, Nature Chemistry, DOI: 10.1038/NCHEM.468, pp. 1-6, 2009.

Hwang and Shaka, Water Suppression That Works. Excitation Sculpting Using Arbitrary Waveforms and Pulsed Field Gradients, Journal of Magnetic Resonance, Series A 112, 275-279 (1995).

Weissermel and Arpe, Industrial Organic Chemistry, 3rd Edition 1997, Published jointly by VCH Verlagsgesellschaft mbH, Weinheim (Federal Republic of Germany) VCH Pubiishers, Inc., New York, NY (USA), pp. 1-481.

T. Iwasita, C. Nart, B. Lopez and W. Vielstich; On the Study of Adsorbed Species at Platinum From Methanol, Formic Acid and Reduced Carbon Dioxide Via in Situ FT-ir Spectroscopy, Electrochimica Atca, vol. 37. No. 12. pp. 2361-2367, 1992, Printed in Great Britain.

Lackner, Grimes, and Ziock; Capturing Carbon Dioxide From Air; pp. 1-15.

Kang, Kim, Lee, Hong, and Moon; Nickel-based tri-reforming catalyst for the production of synthesis gas, Applied Catalysis, A: General 332 (2007) 153-158.

Kostecki and Augustynski, Electrochemical Reduction of CO2 at an Activated Silver Electrode, Ber. Bunsenges. Phys. Chem. 98, 1510-1515 (1994) No. I2 C VCH Verlagsgesellschaft mbH, 0-69451 Weinheim, 1994.

Kunimatsu and Kita; Infrared Spectroscopic Study of Methanol and Formic Acid Adsorrates on a Platinum Electrode, Part II. Role of the Linear CO(a) Derived From Methanol and Formic Acid in the Electrocatalytic Oxidation of CH,OH and HCOOH, J Electroanal Chem., 218 (1987) 155-172, Elsevier Sequoia S A , Lausanne—Printed in The Netherlands.

Li and Prentice, Electrochemical Synthesis of Methanol from CO2 in High-Pressure Electrolyte, J. Electrochem. Soc., vol. 144, No. 12, Dec. 1997 © The Electrochemical Society, Inc., pp. 4284-4288.

Lichter and Roberts, 15N Nuclear Magnetic Resonance Spectroscopy. XIII. Pyridine-15N1, Journal of the American Chemical Society 1 93:20 1 Oct. 6, 1971, pp. 5218-5224.

R.J.L. Martin, The Mechanism of the Cannizzaro Reaction of Formaldehyde, May 28, 1954, pp. 335-347.

Fujitani, Nakamura, Uchijima, and Nakamura; The kinetics and mechanism of methanol synthesis by hydrogenation of CO2 over a Zn-deposited Cu(111surface, Surface Science 383 (1997) 285-298.

Richard S. Nicholson and Irving Shain, Theory of Stationary Electrode Polarography, Single Scan and Cyclic Methods Applied to Reversible, Irreversible, and Kinetic Systems, Analytical Chemistry, vol. 36, No. 4, Apr. 1964, pp. 706-723.

Noda, Ikeda, Yamamoto, Einaga, and Ito; Kinetics of Electrochemical Reduction of Carbon Dioxide on a Gold Electrode in Phosphate Buffer Solutions; Bull. Chem. Soc. Jpn., 68, 1889-1895 (1995).

Joseph W. Ochterski, Thermochemistry in Gaussian, (c)2000, Gaussian, Inc., Jun. 2, 2000, 19 Pages.

Kotaro Ogura and Mitsugu Takagi, Electrocatalytic Reduction of Carbon Dioxide to Methanol, Part IV. Assessment of the Current-Potential Curves Leading to Reduction, J. Electroanal. Chem., 206 (1986) 209-216, Elsevier Sequoia S.A., Lausanne—Printed in The Netherlands.

Ohkawa, Noguchi, Nakayama, Hashimoto, and Fujishima; Electrochemical reduction of carbon dioxide on hydrogen-storing materials, Part 3. The effect of the absorption of hydrogen on the palladium electrodes modified with copper; Journal of Electroanalytical Chemistry, 367 (1994) 165-173.

Ohmstead and Nicholson, Cyclic Voltammetry Theory for the Disproportionation Reaction and Spherical Diffusion, Analytical Chemistry, vol. 41, No. 6, May 1969, pp. 862-864.

Shunichi Fukuzumi, Bioinspired Energy Conversion Systems for Hydrogen Production and Storage, Eur. J. Inorg. Chem. 2008, 1339-1345.

Angamuthu, Byers, Lutz, Spek, and Bouwman; Electrocatalytic CO2 Conversion to Oxalate by a Copper Complex, Science, vol. 327, Jan. 15, 2010, pp. 313-315.

J. Fischer, Th. Lehmann, and E. Heitz; The production of oxalic acid from CO2 and H2O, Journal of Applied Electrochemistry 11 (1981) 743-750.

Rosenthal, Bachman, Dempsey, Esswein, Gray, Hodgkiss, Manke, Luckett, Pistorio, Veige, and Nocera; Oxygen and hydrogen photocatalysis by two-electron mixed-valence coordination compounds, Coordination Chemistry Reviews 249 (2005) 1316-1326.

Rudolph, Dautz, and Jager; Macrocyclic [N42-] Coordinated Nickel Complexes as Catalysts for the Formation of Oxalate by Electrochemical Reduction of Carbon Dioxide, J. Am. Chem. Soc. 2000, 122, 10821-10830.

D.A. Shirley, High-Resolution X-Ray Photoemission Spectrum of the Valence Bands of Gold, Physical Review B, vol. 5, No. 12, Jun. 15, 1972, pp. 4709-4714.

S.G. Sun and J. Clavilier, The Mechanism of Electrocatalytic Oxidation of Formic Acid on Pt (100) and Pt (111) in Sulphuric Acid Solution: An Emirs Study, J. Electroanal. Chem., 240 (1988) 147-159, Elsevier Sequoia S.A., Lausanne—Printed in The Netherlands.

Sun, Lin, Li, and Mu; Kinetics of dissociative adsorption of formic acid on Pt(100), Pt(610), Pt(210), and Pt(110) single-crystal electrodes in perchloric acid solutions, Journal of Electroanalytical Chemistry, 370 (1994) 273-280.

Marek Szklarczyk, Jerzy Sobkowski and Jolanta Pacocha, Adsorption and Reduction of Formic Acid on p-Type Silicon Electrodes, J. Electroanal. Chem., 215 (1986) 307-316, Elsevier Sequoia S.A., Lausanne—Printed in The Netherlands.

Zhao, Fan, and Wang, Photo-catalytic CO2 reduction using sol-gel derived titania-supported zinc-phthalocynine, Journal of Cleaner Production 15 (2007) 1894-1897.

Tanaka and Ooyama, Multi-electron reduction of CO2 via Ru—CO2, —C(O)OH, —CO, —CHO, and —CH2OH species, Coordination Chemistry Reviews 226 (2002) 211-218.

Toyohara, Nagao, Mizukawa, and Tanaka, Ruthenium Formyl Complexes as the Branch Point in Two- and Multi-Electron Reductions of CO2, Inorg. Chem. 1995, 34, 5399-5400.

Watanabe, Shibata, and Kato; Design of Ally Electrocatalysts for CO2 Reduction, III. The Selective and Reversible Reduction of CO2 on Cu Alloy Electrodes; J. Electrochem. Soc., vol. 138, No. 11, Nov. 1991, pp. 3382-3389.

Dr. Chao Lin, Electrode Surface Modification and its Application to Electrocatalysis, V. Catalytic Reduction of Carbon Dioxide to Methanol, Thesis, 1992, Princeton University, pp. 157-179.

Dr. Gayatri Seshadri, Part I. Electrocatalysis at modified semiconductor and metal electrodes; Part II. Electrochemistry of nickel and cadmium hexacyanoferrates, Chapter 2—The Electrocatalytic Reduction of CO2 to Methanol at Low Overpotentials, 1994, Princeton University, pp. 52-85.

Jean-Marie Lehn and Raymond Ziessel, Photochemical generation of carbon monoxide and hydrogen by reduction of carbon dioxide and water under visible light irradiation, Proc. Natl. Acad. Sci. USA, vol. 79, pp. 701-704, Jan. 1982, Chemistry.

Azuma, Hashimoto, Hiramoto, Watanabe, and Sakata; Carbon dioxide reduction at low temperature on various metal electrodes, J. Electroanal. Chem., 260 (1989) 441-445, Elsevier Sequoia S.A., Lausanne—Printed in The Netherlands.

Goettmann, Thomas, and Antonietti; Metal-Free Activation of CO2 by Mesoporous Graphitic Carbon Nitride; Angewandte Chemie; Angew. Chem. Int. Ed. 2007, 46, 2717-2720.

Yu B Vassiliev, V S Bagotzky, O.A. Khazova and NA Mayorova; Electroreduction of Carbon Dioxide Part II. The Mechanism of

(56) References Cited

OTHER PUBLICATIONS

Reduction in Aprotic Solvents, J Electroanal. Chem, 189 (1985) 295-309 Elsevier Sequoia S.A. , Lausanne—Printed in The Netherlands.
Whipple, Finke, and Kenis; Microfluidic Reactor for the Electrochemical Reduction of Carbon Dioxide: The Effect of pH; Electrochemical and Solid-State Letters, 13 (9) B109-B111 (2010), 1099-0062/2010/13(9)/B109/3/$28.00 © The Electrochemical Society.
Zhai, Chiachiarelli, and Sridhar; Effects of Gaseous Impurities on the Electrochemical Reduction of $CO_2$ on Copper Electrodes; ECS Transactions, 19 (14) 1-13 (2009), 10.1149/1.3220175 © The Electrochemical Society.
R.D.L. Smith, P.G. Pickup, Nitrogen-rich polymers for the electrocatalytic reduction of $CO_2$, Electrochem. Commun. (2010), doi:10.1016/j.elecom.2010.10.013.
B.Z. Nikolic, H. Huang, D. Gervasio, A. Lin, C. Fierro, R.R. Adzic, and E.B. Yeager; Electroreduction of carbon dioxide on platinum single crystal electrodes: electrochemical and in situ FTIR studies; J. Electmanal. Chem., 295 (1990) 415-423; Elsevier Sequoia S.A., Lausanne.
Nogami, Itagaki, and Shiratsuchi; Pulsed Electroreduction of $CO_2$ on Copper Electrodes-II; J. Electrochem. Soc., vol. 141, No. 5, May 1994 © The Electrochemical Society, Inc., pp. 1138-1142.
Ichiro Oda, Hirohito Ogasawara, and Masatoki Ito; Carbon Monoxide Adsorption on Copper and Silver Electrodes during Carbon Dioxide Electroreduction Studied by Infrared Reflection Absorption Spectroscopy and Surface-Enhanced Raman Spectroscopy; Langmuir 1996, 12, 1094-1097.
Kotaro Ogura,, Kenichi Mine, Jun Yano, and Hideaki Sugihara; Electrocatalytic Generation of C2 and C3 Compounds from Carbon Dioxide on a Cobalt Complex-immobilized Dual-film Electrode; J . Chem. Soc., Chem. Commun., 1993, pp. 20-21.
Sanchez-Sanchez, Montiel, Tryk, Aldaz, and Fujishima; Electrochemical approaches to alleviation of the problem of carbon dioxide accumulation; Pure Appl. Chem., vol. 73, No. 12, pp. 1917-1927, 2001, © 2001 IUPAC.
D. J. Pickett and K. S. Yap, A study of the production of glyoxylic acid by the electrochemical reduction of oxalic acid solutions, Journal of Applied Electrochemistry 4 (1974) 17-23, Printed in Great Britain, © 1974 Chapman and Hall Ltd.
Bruce A. Parkinson & Paul F. Weaver, Photoelectrochemical pumping of enzymatic $CO_2$ reduction, Nature, vol. 309, May 10, 1984, pp. 148-149.
Paul, Tyagi, Bilakhiya, Bhadbhade, Suresh, and Ramachandraiah; Synthesis and Characterization of Rhodium Complexes Containing 2,4,6-Tris(2-pyridyl)-1,3,5-triazine and Its Metal-Promoted Hydrolytic Products: Potential Uses of the New Complexes in Electrocatalytic Reduction of Carbon Dioxide; Inorg. Chem. 1998, 37, 5733-5742.
Furuya, Yamazaki, and Shibata; High performance Ru—Pd catalysts for $CO_2$ reduction at gas-diffusion electrodes, Journal of Electroanalytical Chemistry 431 (1997) 39-41.
Petit, Chartier, Beley, and Deville; Molecular catalysts in photoelectrochemical cells Study of an efficient system for the selective photoelectroreduction of $CO_2$: p-GaP or p-GaAs / Ni( cyclam) 2+, aqueous medium; J. Electroanal. Chem., 269 (1989) 267-281; Elsevier Sequoia S.A., Lausanne—Printed in The Netherlands.
Popic, Avramov-Ivic, and Vukovic; Reduction of carbon dioxide on ruthenium oxide and modified ruthenium oxide electrodes in 0.5 M $NaHCO_3$, Journal of Electroanalytical Chemistry 421 (1997) 105-110.
Whipple and Kenis, Prospects of $CO_2$ Utilization via Direct Heterogeneous Electrochemical Reduction, J. Phys. Chem. Lett. 2010, 1, 3451-3458, © 2010 American Chemical Society.
P.A. Christensen & S.J. Higgins, Preliminary note the electrochemical reduction of $CO_2$ to oxalate at a Pt electrode immersed in acetonitrile and coated with polyvinylalcohol/[Ni(dppm)2Cl2], Journal of Electroanalytical Chemistry, 387 (1995) 127-132.
Qu, Zhang, Wang, and Xie; Electrochemical reduction of $CO_2$ on $RuO_2/TiO_2$ nanotubes composite modified Pt electrode, Electrochimica Acta 50 (2005) 3576-3580.
Jin, Gao, Jin, Zhang, Cao, ; Wei, and Smith; High-yield reduction of carbon dioxide into formic acid by zero-valent metal/metal oxide redox cycles; Energy Environ. Sci., 2011, 4, pp. 881-884.
Yu B Vassiliev, V S Bagotzky. N V Osetrova and A A Mikhailova; Electroreduction of Carbon Dioxide Part III. Adsorption and Reduction of $CO_2$ on Platinum Metals; J Electroanal Chem. 189 (1985) 311-324, Elsevier Sequoia Sa, Lausanne—Printed in The Netherlands.
M. Gattrell, N. Gupta, and A. Co; A review of the aqueous electrochemical reduction of $CO_2$ to hydrocarbons at copper; Journal of Electroanalytical Chemistry 594 (2006) 1-19.
Noshi, Ito, Suzuki, and Hori; Preliminary note $CO_2$ Reduction on Rh single crystal electrodes and the structural effect; Journal of Electroanalytical Chemistry 395 (1995) 309-312.
Rudolph, Dautz, and Jager; Macrocyclic [N42-] Coordinated Nickel Complexes as Catalysts for the Formation of Oxalate by Electrochemical Reduction of Carbon Dioxide; J. Am. Chem. Soc. 2000, 122, 10821-10830, Published on Web Oct. 21, 2000.
Ryu, Andersen, and Eyring; The Electrode Reduction Kinetics of Carbon Dioxide in Aqueous Solution; The Journal of Physical Chemistry, vol. 76, No. 22, 1972, pp. 3278-3286.
Zhao, Jiang, Han, Li, Zhang, Liu, Hi, and Wu; Electrochemical reduction of supercritical carbon dioxide in ionic liquid 1-n-butyl-3-methylimidazolium hexafluorophosphate; J. of Supercritical Fluids 32 (2004) 287-291.
Schwartz, Cook, Kehoe, MacDuff, Patel, and Sammells; Carbon Dioxide Reduction to Alcohols using Perovskite-Type Electrocatalysts; J. Electrochem. Soc., vol. 140, No. 3, Mar. 1993 © The Electrochemical Society, Inc., pp. 614-618.
Ikeda, Takagi, and Ito; Selective Formation of Formic Acid, Oxalic Acid, and Carbon Monoxide by Electrochemical Reduction of Carbon Dioxide; Bull. Chem. Soc. Jpn., 60, 2517-2522 (1987) © 1987 The Chemical Society of Japan.
Shiratsuchi, Aikoh, and Nogami; Pulsed Electroreduction of $CO_2$ on Copper Electrodes; J, Electrochem. Soc., vol. 140, No. 12, Dec. 1993 © The Electrochemical Society, Inc.
Centi & Perathoner; Towards Solar Fuels from Water and $CO_2$; ChemSusChem 2010, 3, 195-208, © 2010 Wiley-VCH Verlag GmbH& Co. KGaA, Weinheim.
David P. Summers, Steven Leach and Karl W. Frese Jr.; The Electrochemical Reduction of Aqueous Carbon Dioxide to Methanol at Molybdenum Electrodes With Low Overpotentials; J Electroanal. Chem., 205 (1986) 219-232, Elsevier Sequoia S.A., Lausanne—Printed in The Netherlands.
Isao Taniguchi, Benedict Aurian-Blajeni and John O'M. Bockris; Photo-Aided Reduction of Carbon Dioxide to Carbon Monoxide; J. Electroanal. Chem, 157 (1983) 179-182, Elsevier Sequoia S.A., Lausanne—Printed in The Netherlands.
Isao Taniguchi, Benedict Aurian-Blajeni and John O'M. Bockris; The Mediation of the Photoelectrochemical Reduction of Carbon Dioxide by Ammonium Ions; J. Electroanal. Chem, 161 (1984) 385-388, Elsevier Sequoia S.A., Lausanne—Printed in The Netherlands.
Hiroshi Yoneyama, Kenji Sugimura and Susumu Kuwabata; Effects of Electrolytes on the Photoelectrochemical Reduction of Carbon Dioxide at Illuminated p-Type Cadmium Telluride and p-Type Indium Phosphide Electrodes in Aqueous Solutions; J. Electroanal. Chem., 249 (1988) 143-153, Elsevier Sequoia ,S.A., Lausanne—Printed in The Netherlands.
Whipple, Finke, and Kenis; Microfluidic Reactor for the Electrochemical Reduction of Carbon Dioxide: The Effect of pH; Electrochemical and Solid-State Letters, 13 (9) B109-B111 (2010).
YLB Vassiliev, V S Bagotzky, N V. Osetrov, O.A. Khazova and NA Mayorova; Electroreduction of Carbon Dioxide Part I. The Mechanism and Kinetics of Electroreduction of $CO_2$ in Aqueous Solutions on Metals with High and Moderate Hydrogen Overvoltages; J Electroanal. Chem. 189 (1985) 271-294, Elsevier Sequoia SA , Lausanne—Printed in The Netherlands.
YLB Vassiliev, V S Bagotzky, N V. Osetrov, O.A. Khazova and NA Mayorova; Electroreduction of Carbon Dioxide Part II. The Mecha-

(56) References Cited

OTHER PUBLICATIONS nism of Reduction in Aprotic Solvents; J Electroanal. Chem. 189 (1985) 295-309, Elsevier Sequoia SA, Lausanne—Printed in The Netherlands.
Watanabe, Shibata, Kato, Azuma, and Sakata; Design of Alloy Electrocatalysts for C02 Reduction III. The Selective and Reversible Reduction of C02 on Cu Alloy Electrodes; J. Electrochem. Soc., vol. 138, No. 11, Nov. 1991 © The Electrochemical Society, Inc., pp. 3382-3389.
Soichiro Yamamura, Hiroyuki Kojima, Jun Iyoda and Wasaburo Kawai; Photocatalytic Reduction of Carbon Dioxide with Metal-Loaded SiC Powders; J. Eleciroanal. Chem., 247 (1988) 333-337, Elsevier Sequoia S.A., Lausanne—Printed in The Netherlands.
R. Piercy, N. A. Hampson; The electrochemistry of indium, Journal of Applied Electrochemistry 5 (1975) 1-15, Printed in Great Britain, © 1975 Chapman and Hall Ltd.
C. K. Watanabe, K. Nobe; Electrochemical behaviour of indium in H2S04, Journal of Applied Electrochemistry 6 (1976) 159-162, Printed in Great Britain, © 1976 Chapman and Hall Ltd.
Yumi Akahori, Nahoko Iwanaga, Yumi Kato, Osamu Hamamoto, and Mikita Ishii; New Electrochemical Process for CO2 Reduction to from Formic Acid from Combustion Flue Gases; Electrochemistry; vol. 72, No. 4 (2004), pp. 266-270.
Hamamoto, Akahori, Goto, Kato, and Ishii; Modified Carbon Fiber Electrodes for Carbon Dioxide Reduction; Electrochemistry, vol. 72, No. 5 (2004), pp. 322-327.
S. Omanovicâ, M. Metikosï-Hukovic; Indium as a cathodic material: catalytic reduction of formaldehyde; Journal of Applied Electrochemistry 27 (1997) 35-41.
Hara, Kudo, and Sakata; Electrochemical reduction of carbon dioxide under high pressure on various electrodes in an aqueous electrolyte; Journal of Electroanalytical Chemistry 391 (1995) 141-147.
Seshadri et al., A New Homogeneous Electrocatalyst for the Reduction of Carbon Dioxide to Methanol at Low Overpotential, Journal of Electroanalytical Chemistry, 372 (1994), 145-50.
Green et al., Vapor-Liquid Equilibria of Formaldehyde-Methanol-Water, Industrial and Engineering Chemistry (Jan. 1955), vol. 47, No. 1, pp. 103-109.
Scibioh et al., Electrochemical Reduction of Carbon Dioxide: A Status Report, Proc Indian Natn Sci Acad (May 2004), vol. 70, A, No. 3, pp. 407-462.
Gennaro et al., Homogeneous Electron Transfer Catalysis of the Electrochemical Reduction of Carbon Dioxide. Do Aromatic Anion Radicals React in an Outer-Sphere Manner?, J. Am. Chem. Soc. (no month, 1996), vol. 118, pp. 7190-7196.
Perez et al., Activation of Carbon Dioxide by Bicyclic Amidines, J. Org. Chem. (no month, 2004), vol. 69, pp. 8005-8011.
Zaragoza Dorwald, Side Reactions in Organic Synthesis, 2005, Wiley-VCH Verlag GmbH & Co. KGaA, Weinheim, Preface. p. IX.
Liansheng et al, Journal of South Central University Technology, Electrode Selection of Electrolysis with Membrane for Sodium Tungstate Solution, 1999, 6(2), pp. 107-110.
Mahmood et al., Use of Gas-Diffusion Electrodes for High-Rate Electrochemical Reduction of Carbon Dioxide. II. Reduction at Metal Phthalocyanine-Impregnated Electrodes, J. of Appl. Electrochem. (no month, 1987), vol. 17, pp. 1223-1227.
Tanno et al., Electrolysis of Iodine Solution in a New Sodium Bicarbonate-Iodine Hybrid Cycle, International Journal of Hydrogen Energy (no month, 1984), vol. 9, No. 10, pp. 841-848.
Seshadri et al, "A new homogeneous catalyst for the reduction of carbon dioxide to methanol at low overpotential," Journal of Electroanalytical Chemistry, 372 (1994) 145-150.
Hori et al, chapter on "Electrochemical CO2 Reduction on Metal Electrodes," in the book "Modern Aspects of Electrochemistry," vol. 42, pp. 106 and 107.
Czerwinski et al, "Adsorption Study of CO2 on Reticulated vitreous carbon (RVC) covered with platinum," Analytical Letters, vol. 18, Issue 14 (1985), pp. 1717-1722.
Hammouche et al, Chemical Catalysis of Electrochemical Reactions. Homogeneous Catalysis of the Electrochemical Reduction of Carbon Dioxide by Iron ("0") Porphyrins. Role of the Addition of Magnesium Cations. J. Am. Chem. Soc. 1991, 113, 8455-8466.
Hossain et al., Palladium and Cobalt Complexes of Substituted Quinoline, Bipyridine and Phenanthroline as Catalysts for Electrochemical Reduction of Carbon Dioxide, Electrochimica Acta (no month, 1997), vol. 42, No. 16, pp. 2577-2785.
Scibioh et al., "Electrochemical Reduction of Carbon Dioxide: A Status Report", Proc Indian Natn Sci Acad (May 2004), vol. 70, A, No. 3, pp. 407-462.
Hara et al., "Electrochemical Reduction of Carbon Dioxide Under High Pressure on Various Electrodes in an Aqueous Electrolyte", Journal of Electroanalytical Chemistry (no month, 1995), vol. 391, pp. 141-147.
Yamamoto et al., "Production of Syngas Plus Oxygen From CO2 in a Gas-Diffusion Electrode-Based Electrolytic Cell", Electrochimica Acta (no month, 2002), vol. 47, pp. 3327-3334.
Seshadri et al., "A New Homogeneous Electrocatalyst for the Reduction of Carbon Dioxide to Menthanol at Low Overpotential", Journal of Electroanalytical Chemistry, 372 pp. 145-150, Jul. 8, 1994, figure 1; p. 146-147.
Doherty, "Electrochemical Reduction of Butyraldehyde in the Presence of CO2", Electrochimica Acta 47(2002) 2963-2967.
Udupa et al., "The Electrolytic Reduction of Carbon Dioxide to Formic Acid", Electrochimica Acta (no month, 1971), vol. 16, pp. 1593-1598.
Jitaru, Maria, "Electrochemical Carbon Dioxide Reduction"—Fundamental and Applied Topics (Review), Journal of the University of Chemical Technology and Metallurgy (2007), vol. 42, No. 4, pp. 333-344.
Sloop et al., "The Role of Li-ion Battery Electrolyte Reactivity in Performance Decline and Self-Discharge", Journal of Power Sources (no month, 2003), vols. 119-121, pp. 330-337.
Shibata, Masami, et al., "Electrochemical Synthesis of Urea at Gas-Diffusion Electrodes", J. Electrochem. Soc., vol. 145, No. 2, Feb. 1998, pp. 595-600, The Electrochemical Society, Inc.
Shibata, Masami, et al., "Simultaneous Reduction of Carbon Dioxide and Nitrate Ions at Gas-Diffusion Electrodes with Various Metallophthalocyanine Catalysts", From a paper presented at the 4th International Conference on Electrocatalysis: From Theory to Industrial Applications, Sep. 22-25, 2002, Como, Italy, Electrochimica Acta 48 (2003) 3959-3958.
Harrison et al., "The Electrochemical Reduction of Organic Acids", Electroanalytical Chemistry and Interfacial Electrochemistry (no month, 1971), vol. 32, No. 1, pp. 125-135.
Chauhan et al., "Electro Reduction of Acetophenone in Pyridine on a D.M.E.", J Inst. Chemists (India) [Jul. 1983], vol. 55, No. 4, pp. 147-148.
Hori et al, chapter on "Electrochemical CO2 Reduction on Metal Electrodes," in the book Modern Aspects of Electrochemistry, vol. 42, pp. 106 and 107.
Jitaru, Lowy, Toma, Toma and Oniciu, "Electrochemical Reduction of Carbon Dioxide on Flat Metallic Cathodes," Journal of Applied Electrochemistry, 1997, vol. 27, p. 876.
Popic, Avramov, and Vukovic, "Reduction of Carbon Dioxide on Ruthenium Oxide and Modified Ruthenium Oxide Electrodes in 0.5M NaHCO3," Journal of Electroanalytical Chemistry, 1997, vol. 421, pp. 105-110.
Eggins and McNeill, "Voltammetry of Carbon Dioxide. I. A General Survey of Voltammetry at Different Electrode Materials in Different Solvents," Journal of Electroanalytical Chemistry, 1983, vol. 148, pp. 17-24.
Kostecki and Augustynski, "Electrochemical Reduction of CO2 at an Active Silver Electrode," Ber. Busenges. Phys. Chem., 1994, vol. 98, pp. 1510-1515.
Non-Final Office Action for U.S. Appl. No. 12/846,221, dated Nov. 21, 2012.
Non-Final Office Action for U.S. Appl. No. 12/846,011, dated Aug. 29, 2012.
Non-Final Office Action for U.S. Appl. No. 12/846,002, dated Sep. 11, 2012.

(56) References Cited

OTHER PUBLICATIONS

Non-Final Office Action for U.S. Appl. No. 12/845,995, dated Aug. 13, 2012.
Final Office Action for U.S. Appl. No. 12/845,995, dated Nov. 28, 2012.
Non-Final Office Action for U.S. Appl. No. 12/696,840, dated Jul. 9, 2012.
Non-Final Office Action for U.S. Appl. No. 13/472,039, dated Sep. 13, 2012.
DNV (Det Norske Veritas), Carbon Dioxide Utilization, Electrochemical Conversion of CO2—Opportunities and Challenges, Research and Innovation, Position Paper, Jul. 2011.
Matthew R. Hudson, Electrochemical Reduction of Carbon Dioxide, Department of Chemistry, State University of New York at Potsdam, Potsdam New York 13676, pp. 1-15, Dec. 9, 2005.
Colin Oloman and Hui Li, Electrochemical Processing of Carbon Dioxide, ChemSusChem 2008, 1, 385-391, (c) 2008 Wiley-VCH Verlag GmbH& Co. KGaA, Weinheim, www.chemsuschem.org.
Seshardi G., Lin C., Bocarsly A.B., A new homogeneous electrocatalyst for the reduction of carbon dioxide to methanol at low overpotential, Journal of Electroanalytical Chemistry, 1994, 372, pp. 145-150.
Chen et al., "Tin oxide dependence of the CO2 reduction efficiency on tin electrodes and enhanced activity for tin/tin oxide thin-film catalysts." Journal of the American Chemical Society 134, No. 4 (2012): 1986-1989, Jan. 9, 2012, retrieved on-line.
Zhou et al. "Anodic passivation processes of indium in alkaline solution [J]" Journal of Chinese Society for Corrosion and Protection 1 (2005): 005, Feb. 2005.
Fukaya et al., "Electrochemical Reduction of Carbon Dioxide to Formate Catalyzed by Rh(bpy)3Cl3", Kagaku Gijutsu Kenkyusho Hokoku (no month, 1986), vol. 81, No. 5, pp. 255-258.
Scibioh et al, "Electrochemical Reductin of Carbon Dioxide: A Status Report," Proc. Indian Natn Science Acad., 70, A, No. 3, May 2004, pp. 407-762.
Fukaya et al., "Electrochemical Reduction of Carbon Dioxide to Formate Catalyzed by Rh(bpy)3Cl3", Kagaku Gijutsu Kenkyusho Hokoku (no month, 1986), vol. 81, No. 5, pp. 255-258. 1-page abstract only.
Li et al., "The Electro-Reduction of Carbon Dioxide in a Continuous Reactor", J. of Applied Electrochemistry (no month, 2005), vol. 35, pp. 955-965.
Kaneco et al., "Electrochemical Reduction of Carbon Dioxide to Ethylene with High Faradaic Efficiency at a Cu Electrode in CsOH/Methanol", Electrochimica Acta (no month, 1999), vol. 44, pp. 4701-4706.
Kaneco et al., "Electrochemical Conversion of Carbon Dioxide to Formic Acid on Pb in KOH/Methanol Electrolyte at Ambient Temperature and Pressure", Energy (no month, 1998), vol. 23, No. 12, pp. 1107-1112.
Yuan et al., "Electrochemical Activation of Carbon Dioxide for Synthesis of Dimethyl Carbonate in an Ionic Liquid", Electrochimica Acta (no month, 2009), vol. 54, pp. 2912-2915.
U.S. Appl. No. 13/724,647, filed Dec. 21, 2012; Office Action dated Oct. 17, 2013.
U.S. Appl. No. 13/787,481, filed Mar. 6, 2013; Office Action dated Sep. 13, 2013.
U.S. Appl. No. 13/724,082, filed Dec. 21, 2012; Office Action dated Aug. 12, 2013.
U.S. Appl. No. 13/724,522, filed Dec. 21, 2012; Office Action dated Oct. 1, 2013.
U.S. Appl. No. 13/724,885, filed Dec. 21, 2012; Office Action dated Aug. 21, 2013.
U.S. Appl. No. 13/724,231, filed Dec. 21, 2012; Office Action dated Aug. 20, 2013.
Green et al., "Vapor-Liquid Equilibria of Formaldehyde-Methanol-Water", Industrial and Engineering Chemistry (Jan. 1955), vol. 47, No. 1, pp. 103-109.
Shibata et al., "Electrochemical Synthesis of Urea at Gas-Diffusion Electrodes Part VI. Simultaneous Reduction of Carbon Dioxide and Nitrite Ions with Various Metallophthalocyanine Catalysts". J. of Electroanalytical Chemistry (no month, 2001), vol. 507, pp. 177-184.
Jaaskelainen and Haukka, The Use of Carbon Dioxide in Ruthenium Carbonyl Catalyzed 1-hexene Hydroformylation Promoted by Alkali Metal and Alkaline Earth Salts, Applied Catalysis A: General, 247, 95-100 (2003).
Heldebrant et al., "Reversible Zwitterionic Liquids, The Reaction of Alkanol Guanidines, Alkanol Amidines, and Diamines wih CO2", Green Chem. (mo month, 2010), vol. 12, pp. 713-721.
Perez et al., "Activation of Carbon Dioxide by Bicyclic Amidines", J. Org. Chem. (no month, 2004), vol. 69, pp. 8005-8011.
Wu et al., "Electrochemical Reduction of Carbon Dioxide I. Effects of the Electrolyte on the Selectivity and Activity with Sn Electrode", Journal of the Electrochemical Society (no month, 2012), vol. 159, No. 7, pp. F353-F359.
Chaplin et al., "Effects of Process Conditions and Electrode Material on Reaction Pathways for Carbon Dioxide Electroreduction with Particular Reference to Formate Formation", Journal of Applied Electrochemistry (no month, 2003), vol. 33, pp. 1107-1123.
Jaime-Ferrer et al., "Three-Compartment Bipolar Membrane Electrodialysis for Splitting of Sodium Formate into Formic Acid and Sodium Hydroxide: Role of Diffusion of Molecular Acid", Journal of Membrane Science (no month, 2008), vol. 325, pp. 528-536.
James Grimshaw, Electrochemical Reactions and Mechanisms in Organic Chemistry, 2000, ISBN 978-0-444-72007-8. [retrieved on Jan. 3, 2014]. Retrieved from the Internet. <URL: http://f3.tiera.ru/ShiZ/Great%20Science%20TextBooks/Great%Science%20Textbooks%20DVD%20Library%202007%20-%20Supplement%20Five/Chemistry/Organic%20Chemistry/Electrochemical%20Reactions%20and%20Mechanisms%20in%20Organic%20Chemistry%20-%20J.%20Grimshaw%20%28Elsevier,%202000%29%WW.pdf>.
Fischer, J. et al. "The production of oxalic acid from CO2 and H2O." Journal of Applied Electrochemistry, 1981, vol. 11, pp. 743-750.
Goodridge, F. et al., The electrolytic reduction of carbon dioxide and monoxide for the production of carboxylic acids.: Journal of applied electrochemistry, 1984, vol. 14, pp. 791-796.
Scibioh et al, "Electrochemical Reduction of Carbon Dioxide: A Status Report," Proc. Indian Natn Science Acad., 70, A, No. 3, May 2004, pp. 407-762.
Hon et al, "Enhanced Formation of Ethylene and Alcohols at Ambient Temperature and Pressure in Electrochemical Reduction of Carbon Dioxide at a Copper Electrode," J. Chem. Soc. Chem. Commun. (1988), pp. 17-19.
Hossain et al, "Palladium and Cobalt Complexes of Substituted Quinoline, Bipyridine and Phenanthroline as Catalysts for Electrochemical Reduction of Carbon Dioxide," Electrochimica Acta, vol. 42, No. 16 (1997), pp. 2577-2585.
Fischer, "Liquid Fuels from Water Gas", Industrial and Engineering Chemistry, vol. 17, No. 6, Jun. 1925, pp. 574-576.
Williamson et al, "Rate of Absorption and Equilibrium of Carbon Dioxide in Alkaline Solutions", Industrial and Engineering Chemistry, vol. 16, No. 11, Nov. 1924, pp. 1157-1161.
Hori, "Electrochemical CO2 Reduction on Metal Electrodes", Modern Aspects of Electrochemistry, No. 42, 2008, pp. 89-189.
Seshadri et al., "A new homogeneous electrocatalyst for the reduction of carbon dioxide to methanol at low overpotential", Journal of Electroanalytical Chemistry and Interfacial Electro Chemistry, Elsevier, Amsterdam, NL, vol. 372, No. 1-2, Jul. 8, 1994, pp. 145-150.
Hossain et al., "Palladium and cobalt complexes of substituted quinoline, bipyridine and phenanthroline as catalysts for electrochemical reduction of carbon dioxide", Electrochimica Acta, Elsevier Science Publishers, vol. 42, No. 16, Jan. 1, 1997, pp. 2577-2585.
Fisher et al., "Electrocatalytic reduction of carbon dioxide by using macrocycles of nickel and cobalt", Journal of the American Chemical Society, vol. 102, No. 24, Sep. 1, 1980, pp. 7361-7363.
Ishida et al., Selective Formation of HC00—In the Electrochemical CO2 Reduction Catalyzed by URU(BPY)2(CO)2 3/4 2+ (BPY= 2,2'-Bipyridine), Journal of the Chemical Society, Chemical Communications, Chemical Society, Letchworth, GB, Jan. 1, 1987, pp. 131-132.

(56) References Cited

OTHER PUBLICATIONS

Zhao et al., "Electrochemical reduction of supercritical carbon dioxide in ionic liquid 1-n-butyl-3-methylimidazolium hexafluorophosphate", Journal of Supercritical Fluids, PRA Press, US, vol. 32, No. 1-3, Dec. 1, 2004, pp. 287-291.

Nefedov and Manov-Yuvenskii, The Effect of Pyridine Bases and Transition-Metal Oxides on the Activity of PdCl2 in the Carbonylation of Aromatic Mononitro Compounds by Carbon Monoxide, 28 Bulletin of the Acad. of Sciences of the USSR 3, 540-543 (1979).

Vojinovic "Bromine oxidation and bromine reduction in propylene carbonate" Journal of Electroanalytical Chemistry, 547 (2003) p. 109-113.

Babic et al (Electrochimica Acta, 51, 2006, 3820-3826).

Yoshida et al. (Journal of Electroanalytical Chemistry, 385, 1995, 209-225).

Tinnemans et al., "Tetraaza-macrocyclic cobalt(II) and nickel(II) complexes as electron-transfer agents in the photo (electro)chemical and electrochemical reduction of carbon dioxide," Recl.Trav. Chim. Pays-Bas, Oct. 1984, 103: 288-295.

Bocarsly et al., "Photoelectrochemical conversion of carbon dioxide to methanol and higher alcohols, a chemical carbon sequestration strategy," Preprints of Symposia—American Chemical Society, Division of Fuel Chemistry, vol. 53, Issue: 1, pp. 240-241.

T. Meisel et al., The thermal decomposition of alkali metal formates, Journal of Thermal Analysis, vol. 7, No. 1, Feb. 1, 1975, pp. 73-80.

Cole, EB et al., Using a One-Electron Shuttle for the Multielectron Reduction of CO2 to Methanol: Kinetic, Mechanistic, and Structural Insights, Journal of the American Chemical Society, Jul. 28, 2010, vol. 132, pp. 11539-11551.

Matayoshi et al., Electrochemical Reforming of CH4—CO2 Gas Using Porous Gd-Doped Ceria Electrolyte with Ni and Ru Electrodes, Journal of the Ceramic Society of Japan, vol. 117, 2009, pp. 1107-1112, Abstract Only.

Koeleli et al., Electrochemical Reduction of CO2 at Pb- and Sn-Electrodes in a Fixed-Bed Reactor in Aqueous K2CO3 and KHCO3 Media, Journal of Applied Electrochemistry, vol. 33, No. 5, 2003, pp. 447-450, Abstract Only.

Cao et al., Electrocatalytic Reduction of Carbon Dioxide Using Cobalt Tetrakis(4-Trimethylammoniophenyl)porphyrin Iodide Under High Pressure, Huaxue Xuebao, vol. 44, No. 3, 1986, pp. 220-224, Abstract Only.

Shibata et al., "Simultaneous Reduction of Carbon Dioxide and Nitrate Ions at Gas-Diffusion Electrodes with Various Metal-lophthalocyanine Catalysts", Electrochima Acta (no month, 2003), vol. 48, pp. 3953-3958.

Shibata et al., "Electrochemical Synthesis of Urea at Gas-Diffusion Electrodes", J. Electrochem. Soc. (Jul. 1998), vol. 145, No. 7, pp. 2348-2353.

Non-Final Office Action for U.S. Appl. No. 12/875,227, dated Dec. 11, 2012.

* cited by examiner

GAS EVOLUTION IN ELECTROCHEMICAL CELL

| CATHODE MATERIAL | FY CO (%) | FY $H_2$ (%) | RATIO CO TO $H_2$ |
|---|---|---|---|
| Pt | 0.0 | 15.0 | 0 TO 1 |
| Pd | 0.0 | 0.0 | 0 TO 0 |
| Cu | 9.60 | 72.57 | 1 TO 7.6 |
| Mo | 2.78 | 2.87 | 1 TO 1.03 |
| W | 9.19 | 77.93 | 1 TO 8.5 |
| Co | 0.00 | 53.84 | 0 TO 1 |
| Ag | 0.00 | 51.46 | 0 TO 1 |
| Ni | 0.10 | 40.95 | 1 TO 395 |
| Cr | 12.16 | 0.00 | 1 TO 0 |
| Nb | 13.61 | 0.00 | 1 TO 0 |
| V | 0.00 | 55.32 | 0 TO 1 |
| Ti | 0.00 | 0.00 | 0 TO 0 |
| Ru | 19.79 | 0.00 | 1 TO 0 |
| GLASSY CARBON | 6.87 | 0.00 | 1 TO 0 |
| Sn | 23.22 | 0.00 | 1 TO 0 |
| NiCr | 0.00 | 56.81 | 0 TO 1 |
| NiFe | 7.45 | 4.89 | 1 TO 0.7 |
| CuMnNi | 25.33 | 61.67 | 1 TO 2.5 |
| 260 BRASS | 0.00 | 41.88 | 0 TO 1 |
| 464 BRASS | 4.59 | 17.78 | 1 TO 3.9 |
| SS 304 | 7.9 | 0.0 | 1 TO 0 |
| SS 316 | 9.0 | 0.0 | 1 TO 0 |
| SS 321 | 7.6 | 0.0 | 1 TO 0 |
| SS 430 | 5.2 | 0.0 | 1 TO 0 |
| SS 2205 | 8.3 | 0.0 | 1 TO 0 |
| SS 414 | 9.0 | 0.0 | 1 TO 0 |
| SS 1006 | 5.3 | 0.0 | 1 TO 0 |

FIG. 2

ELECTROCHEMICAL PRODUCTION OF SYNTHESIS GAS FROM CARBON DIOXIDE

CROSS REFERENCE TO RELATED APPLICATIONS

The present application claims the benefit under 35 U.S.C. 35 U.S.C. § 120 of U.S. patent application Ser. No. 12/846,002 filed Jul. 29, 2010. The U.S. patent application Ser. No. 12/846,002 filed Jul. 29, 2010 is hereby incorporated by reference in its entirety.

FIELD OF THE INVENTION

The present invention relates to chemical reduction generally and, more particularly, to a method and/or apparatus for implementing electrochemical production of synthesis gas from carbon dioxide.

BACKGROUND OF THE INVENTION

The combustion of fossil fuels in activities such as electricity generation, transportation and manufacturing produces billions of tons of carbon dioxide annually. Research since the 1970s indicates increasing concentrations of carbon dioxide in the atmosphere may be responsible for altering the Earth's climate, changing the pH of the oceans and other potentially damaging effects. Countries around the world, including the United States, are seeking ways to mitigate emissions of carbon dioxide.

A mechanism for mitigating emissions is to convert carbon dioxide into economically valuable materials such as fuels and industrial chemicals. If the carbon dioxide is converted using energy from renewable sources, both mitigation of carbon dioxide emissions and conversion of renewable energy into a chemical form that can be stored for later use will be possible. Electrochemical and photochemical pathways are techniques for the carbon dioxide conversion.

Previous work in the field has many limitations, including the stability of systems used in the process, the efficiency of systems, the selectivity of the system or process for a desired chemical, the cost of materials used in systems/processes, the ability to control the process effectively, and the rate at which carbon dioxide is converted. Existing systems for producing synthesis gas rely on gasification of biomass or steam reformation of methane. The processes use high temperatures and pressures. In the case of synthesis gas made from fossil fuels, liquid fuels made therefrom increase greenhouse gas emissions. Synthesis gas from biomass can reduce greenhouse gas emissions, but can be difficult to convert efficiently and produces unwanted ash and other toxic substances. No commercially available solutions for converting carbon dioxide to economically valuable fuels or industrial chemicals currently exist. Laboratories around the world have attempted for many years to use electrochemistry and/or photochemistry to convert carbon dioxide to economically valuable products. Hundreds of publications exist on the subject, starting with work in the 19th century. Much of the work done prior to 1999 is summarized in "Greenhouse Gas Carbon Dioxide Mitigation Science and Technology", by Halmann and Steinberg. A more recent overview of work on electrochemical means of reducing carbon dioxide is "Electrochemical Carbon Dioxide Reduction—Fundamental and Applied Topics (Review)", by Maria Jitaru in Journal of the University of Chemical Technology and Metallurgy, 2007, pages 333-344.

Laboratory electrochemical methods usually involve a small (i.e., <1 liter) glass cell containing electrodes and an aqueous solution with supporting electrolyte in which carbon dioxide is bubbled, though a solvent other than water can be used. Reduction of the carbon dioxide takes place directly on the cathode or via a mediator in the solution that is either a transition metal or a transition metal complex. Photoelectrochemical methods also incorporate aqueous solutions with supporting electrolyte in which carbon dioxide is bubbled. The main difference is that some or all of the energy for reducing the carbon dioxide comes from sunlight. The reduction of the carbon dioxide takes place on a photovoltaic material, or on a catalyst photosensitized by a dye. All systems developed to date have failed to make commercial systems for the reasons outlined above. The systems developed in laboratories could not be scaled to commercial or industrial size because of various performance limitations.

Existing electrochemical and photochemical processes/systems have one or more of the following problems that prevent commercialization on a large scale. Several processes utilize metals such as ruthenium or gold that are rare and expensive. In other processes, organic solvents were used that made scaling the process difficult because of the costs and availability of the solvents, such as dimethyl sulfoxide, acetonitrile and propylene carbonate. Copper, silver and gold have been found to reduce carbon dioxide to various products. However, the electrodes are quickly "poisoned" by undesirable reactions on the electrode and often cease to work in less than an hour. Similarly, gallium-based semiconductors reduce carbon dioxide, but rapidly dissolve in water. Many cathodes make a mix of organic products. For instance, copper produces a mix of gases and liquids including methane, formic acid, ethylene and ethanol. A mix of products makes extraction and purification of the products costly and can result in undesirable waste products to dispose. Much of the work done to date on carbon dioxide reduction is inefficient because of high electrical potentials utilized, low faradaic yields of desired products and/or high pressure operation. The energy consumed for reducing carbon dioxide thus becomes prohibitive. Many conventional carbon dioxide reduction techniques have very low rates of reaction. For example, some commercial systems have current densities in excess of 100 milliamperes per centimeter squared (mA/cm2), while rates achieved in the laboratory are orders of magnitude less.

SUMMARY OF THE INVENTION

The present invention concerns a method for electrochemical production of synthesis gas from carbon dioxide. The method generally includes steps (A) to (C). Step (A) may bubble the carbon dioxide into a solution of an electrolyte and a catalyst in a divided electrochemical cell. The divided electrochemical cell may include an anode in a first cell compartment and a cathode in a second cell compartment. The cathode generally reduces the carbon dioxide into a plurality of components. Step (B) may establish a molar ratio of the components in the synthesis gas by adjusting at least one of (i) a cathode material and (ii) a surface morphology of the cathode. Step (C) may separate the synthesis gas from the solution.

The objects, features and advantages of the present invention include providing a method and/or apparatus for implementing electrochemical production of synthesis gas from carbon dioxide that may provide (i) cathode combinations for simultaneous evolution of carbon monoxide and hydrogen gas using carbon dioxide and water as feedstock, (ii) combinations of cathode materials, electrolytes, electrical potentials, pH levels, carbon dioxide flow rates and/or heterocycle catalysts, used to get a desired molar ratios of carbon monoxide and hydrogen gas, (iii) specific process conditions that optimize the carbon dioxide conversion to carbon monoxide while optimizing hydrogen gas evolution, (iv) a choice of specific configurations of heterocyclic amine catalysts with engineered functional groups, process conditions that may facilitate long life electrode and cell cycling and/or (vi) process conditions that may provide long-term product recovery.

BRIEF DESCRIPTION OF THE DRAWINGS

These and other objects, features and advantages of the present invention will be apparent from the following detailed description and the appended claims and drawings in which:

FIG. 2 is a table illustrating relative organic product yields for different cathodes;

DETAILED DESCRIPTION OF THE PREFERRED EMBODIMENTS

Figure 1:
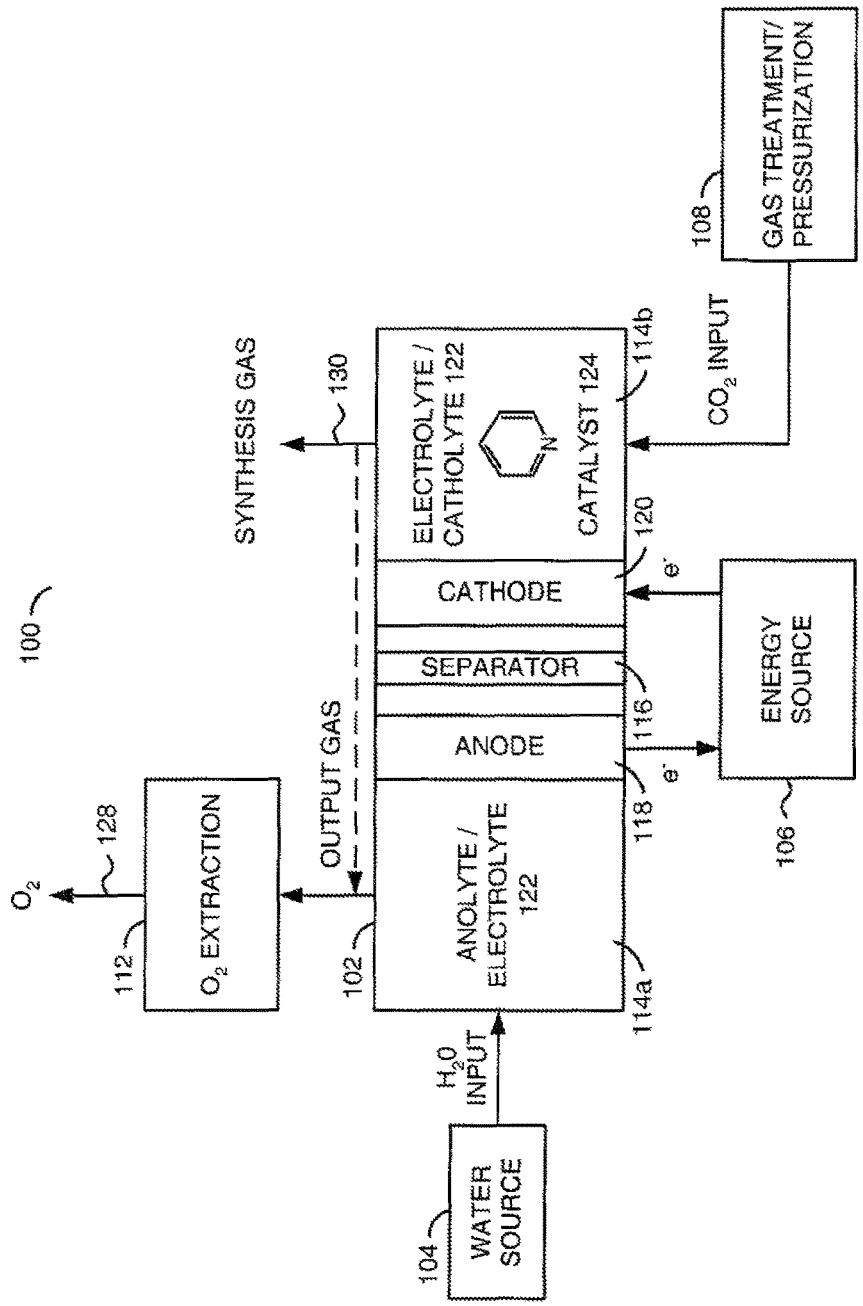
FIG. 1 is a block diagram of a system in accordance with a preferred embodiment of the present invention.

In accordance with some embodiments of the present invention, an electro-catalytic system is provided that generally allows carbon dioxide to be converted at modest overpotentials to highly reduced species in an aqueous solution. Some embodiments generally relate to an evolution of carbon monoxide and hydrogen gas from carbon dioxide and water. Carbon-carbon bonds and/or carbon-hydrogen bonds may be formed in the aqueous solution under mild conditions utilizing a minimum of energy. In some embodiments, the energy used by the system may be generated from an alternative energy source or directly using visible light, depending on how the system is implemented.

The reduction of carbon dioxide may be suitably catalyzed by aromatic heterocyclic amines (e.g., pyridine, imidazole and substituted derivatives.) Simple organic compounds have been found Effective and stable homogenous electrocatalysts and photoelectrocatalysts for the aqueous multiple electron, multiple proton reduction of carbon dioxide to organic products, such as formic acid, formaldehyde and methanol. High faradaic yields for the reduced products have generally been found in both electrochemical and photoelectrochemical systems at low reaction overpotentials.

Some embodiments of the present invention thus relate to environmentally beneficial methods for reducing carbon dioxide. The methods generally include electrochemically and/or photoelectrochemically reducing the carbon dioxide in an aqueous, electrolyte-supported divided electrochemical cell that includes an anode (e.g., an inert conductive counter electrode) in a cell compartment and a conductive or p-type semiconductor working cathode electrode in a other cell compartment. A catalyst of one or more substituted or unsubstituted aromatic heterocyclic amines may be included to produce a reduced organic product. Carbon dioxide may be continuously bubbled through the cathode electrolyte solution to saturate the solution.

For electrochemical reductions, the electrode may be a suitable conductive electrode, such as Al, Au, Ag, Cd, C, Co, Cr, Cu, Cu alloys (e.g., brass and bronze), Ga, Hg, In, Ir, Mo, Nb, Ni, Ni alloys, Ni—Fe alloys, Os, Pd, Pt, Rh, Ru, Sn, Sn alloys, Ti, V, W, Zn, stainless steel (SS), austenitic steel, ferritic steel, duplex steel, martensitic steel, Nichrome, elgiloy (e.g., Co—Ni—Cr), degenerately doped p-Si, degenerately doped p-Si:As and degenerately doped p-Si:B. Other conductive electrodes may be implemented to meet the criteria of a particular application. For photoelectrochemical reductions, the electrode may be a p-type semiconductor, such as p-GaAs, p-GaP, p-InN, p-InP, p-CdTe, p-GaInP$_2$ and p-Si. Other semiconductor electrodes may be implemented to meet the criteria of a particular application.

The catalyst for conversion of carbon dioxide electrochemically or photoelectrochemically may be a substituted or unsubstituted aromatic heterocyclic amine. Suitable amines are generally heterocycles which may include, but are not limited to, heterocyclic compounds that are 5-member or 6-member rings with at least one ring nitrogen. For example, pyridines, imidazoles and related species with at least one five-member ring, bipyridines (e.g., two connected pyridines) and substituted derivatives were generally found suitable as catalysts for the electrochemical reduction and/or the photoelectrochemical reduction. Amines that have sulfur or oxygen in the rings may also be suitable for the reductions. Amines with sulfur or oxygen may include thiazoles or oxazoles. Other aromatic amines (e.g., quinolines, adenine, benzimidazole and 1,10-phenanthroline) may also be effective electrocatalysts.

Before any embodiments of the invention are explained in detail, it is to be understood that the embodiments may not be limited in application per the details of the structure or the function as set forth in the following descriptions or illustrated in the figures of the drawing. Different embodiments may be capable of being practiced or carried out in various ways. Also, it is to be understood that the phraseology and terminology used herein is for the purpose of description and should not be regarded as limiting. The use of terms such as "including," "comprising," or "having" and variations thereof herein are generally meant to encompass the item listed thereafter and equivalents thereof as well as additional items. Further, unless otherwise noted, technical terms may be used according to conventional usage.

In the following description of methods, process steps may be carried out over a range of temperatures (e.g., approximately 10° C. (Celsius) to 50° C.) and a range of pressures (e.g., approximately 1 to 10 atmospheres) unless otherwise specified. Numerical ranges recited herein generally include all values from the lower value to the upper value (e.g., all possible combinations of numerical values between the lowest value and the highest value enumerated are considered expressly stated). For example, if a concentration range or beneficial effect range is stated as 1% to 50%, it is intended that values such as 2% to 40%, 10% to 30%, or 1% 3%, etc., are expressly enumerated. The above may be simple examples of what is specifically intended.

A use of electrochemical or photoelectrochemical reduction of carbon dioxide, tailored with certain electrocatalysts, may produce carbon monoxide and/or hydrogen gas in a high yield of 0% to about 100%. Relative yields may be controlled by changing the cathode materials, catalysts and various aspects of reaction conditions such as pH and carbon dioxide flow rate.

The overall reaction for the evolution of synthesis gas from carbon dioxide may be represented as follows;

$$CO_2+H_2O \rightarrow CO+H_2+O_2$$

The reduction of the carbon dioxide may be suitably achieved efficiently in a divided electrochemical or photo-electrochemical cell in which (i) a compartment contains an anode that is an inert counter electrode and (ii) another compartment contains a working cathode electrode and one or more substituted or unsubstituted aromatic heterocyclic amines. The compartments may be separated by a porous glass frit or other ion conducting bridge. Both compartments generally contain an aqueous solution of an electrolyte. Carbon dioxide gas may be continuously bubbled through the cathodic electrolyte solution to saturate the solution.

In the working electrode compartment, carbon dioxide may be continuously bubbled through the solution. In some embodiments, if the working electrode is a conductor, an external bias may be impressed across the cell such that the potential of the working electrode is held constant. In other embodiments, if the working electrode is a p-type semiconductor, the electrode may be suitably illuminated with light. An energy of the light may be matching or greater than a bandgap of the semiconductor during the electrolysis. Furthermore, either no external source of electrical energy may be used or a modest bias (e.g., about 500 millivolts) may be applied. The working electrode potential is generally held constant relative to a saturated calomel electrode (SCE). The electrical energy for the electrochemical reduction of carbon dioxide may come from a normal energy source, including nuclear and alternatives (e.g., hydroelectric, wind, solar power, geothermal, etc.), from a solar cell or other nonfossil fuel source of electricity, provided that the electrical source supply at least 1.6 volts across the cell. Other voltage values may be adjusted depending on the internal resistance of the cell employed.

Advantageously, the carbon dioxide may be obtained from any sources (e.g., an exhaust stream from fossil-fuel burning power or industrial plants, from geothermal or natural gas wells or the atmosphere itself). The carbon dioxide may be obtained from concentrated point sources of generation prior to being released into the atmosphere. For example, high concentration carbon dioxide sources may frequently accompany natural gas in amounts of 5% to 50%, exist in flue gases of fossil fuel (e.g., coal, natural gas, oil, etc.) burning power plants and nearly pure carbon dioxide may be exhausted of cement factories and from fermenters used for industrial fermentation of ethanol. Certain geothermal steams may also contain significant amounts of carbon dioxide. The carbon dioxide emissions from varied industries, including geothermal wells, may be captured on-site. Separation of the carbon dioxide from such exhausts is known. Thus, the capture and use of existing atmospheric carbon dioxide in accordance with some embodiments of the present invention generally allow the carbon dioxide to be a renewable and unlimited source of carbon.

For electrochemical conversions, the carbon dioxide may be readily reduced in an aqueous medium with a conductive electrode. Faradaic efficiencies have been found high, some reaching about 100%. A mix of cathode materials may be used to achieve the desired carbon dioxide to hydrogen ratio for the synthesis gas. The mix may include alloys and/or an aggregate of several adjoining materials. The adjoining materials may form strip patterns, dot patterns, speckles and other multi-surfaced arrangements. For photoelectrochemical conversions, the carbon dioxide may be readily reduced with a p-type semiconductor electrode, such as p-GaP, p-GaAs, p-InP, p-InN, p-WSe$_2$, p-CdTe, p-GaInP$_2$ and p-Si.

The electrochemical/photoelectrochemical reduction of the carbon dioxide generally utilizes one or more catalysts in the aqueous solution. Aromatic heterocyclic amines may include, but are not limited to, unsubstituted and substituted pyridines and imidazoles. Substituted pyridines and imidazoles may include, but are not limited to mono and disubstituted pyridines and imidazoles. For example, suitable catalysts may include straight chain or branched chain lower alkyl (e.g., C1—C10) mono and disubstituted compounds such as 2-methylpyridine, 4-tertbutyl pyridine, 2,6-dimethylpyridine (2,6-lutidine); bipyridines, such as 4,4'-bipyridine; amino-substituted pyridines, such as 4-dimethylamino pyridine; and hydroxyl-substituted pyridines (e.g., 4-hydroxy-pyridine) and substituted or unsubstituted quinoline or isoquinolines. The catalysts may also suitably include substituted or unsubstituted dinitrogen heterocyclic amines, such as pyrazine, pyridazine and pyrimidine. Other catalysts generally include azoles, imidazoles, indoles, oxazoles, thiazoles, substituted species and complex multi-ring amines such as adenine, pterin, pteridine, benzimidazole, phenonthroline and the like.

A variety of heterocycle catalysts may be used. Some of the catalysts may selectively produce carbon monoxide, such as quinoline. Cathode materials that work with heterocyclic catalysts generally include Sn, Cu, Cu alloys such as brass or bronze, and stainless steels. Some cathode materials may be combined with other cathode materials more selective to hydrogen evolution, such as platinum group metals (e.g., Ir, os, Pd, Pt, Rh and Ru), to produce a desired carbon monoxide to hydrogen molar ratio at a given potential and pH.

Referring to FIG. 1, a block diagram of a system 100 is shown in accordance with a preferred embodiment of the present invention. The system (or apparatus) 100 generally comprises a cell (or container) 102, a liquid source 104, a power source 106, a gas source 108 and an extractor 112. An output gas may be presented from the extractor 112. Another output gas may be presented from the cell 102.

The cell 102 may be implemented as a divided cell. The divided cell may be a divided electrochemical cell and/or a divided photochemical cell. The cell 102 is generally operational to reduce carbon dioxide ($CO_2$) into one or more products. The reduction generally takes place by bubbling carbon dioxide into an aqueous solution of an electrolyte in the cell 102. A cathode in the cell 102 may reduce the carbon dioxide and protons into one or more molecules (e.g., carbon monoxide and/or hydrogen) and/or organic compounds.

The cell 102 generally comprises two or more compartments (or chambers) 114a-114b, a separator (or membrane) 116, an anode 118 and a cathode 120. The anode 118 may be disposed in a given compartment (e.g., 114a). The cathode 120 may be disposed in another compartment (e.g., 114b) on an opposite side of the separator 116 as the anode 118. An aqueous solution 122 may fill both compartments 114a-114b. A catalyst 124 may be added to the compartment 114b containing the cathode 120.

The liquid source 104 may implement a water source. The liquid source 104 may be operational to provide pure water to the cell 102.

The power source 106 may implement a variable voltage source. The source 106 may be operational to generate an electrical potential between the anode 118 and the cathode 120. The electrical potential may be a DC voltage.

The gas source 108 may implement a carbon dioxide source. The source 108 is generally operational to provide carbon dioxide to the cell 102. In some embodiments, the carbon dioxide is bubbled directly into the compartment 114b containing the cathode 120.

The extractor 112 may implement an oxygen extractor. The extractor 112 is generally operational to extract oxygen (e.g., $O_2$) byproducts created by the reduction of the carbon dioxide and/or the oxidation of water. The extracted oxygen may be presented through a port 128 of the system 100 for subsequent storage and/or consumption by other devices and/or processes. Synthesis gases (e.g., carbon monoxide and hydrogen gas) created by the reduction of the carbon dioxide may be extracted from the cell 102 via a port 130.

In the process described, water may be oxidized (or split) into protons and oxygen at the anode 118 while the carbon dioxide is reduced to carbon monoxide at the cathode 120. Protons from oxidized water may also be reduced to hydrogen gas at the cathode 120. The electrolyte 122 in the cell 102 may use water as a solvent with any salts that are water soluble and the catalyst 124. The catalysts 124 may include, but are not limited to, nitrogen, sulfur and oxygen containing heterocycles. Examples of the heterocyclic compounds may be pyridine, imidazole, pyrrole, thiazole, furan, thiophene and the substituted heterocycles such as amino-thiazole and benzimidazole. Cathode materials generally include any conductor. The cathode material may be configured in such a way that an appropriate ratio of hydrogen gas and carbon monoxide are produced at the cathode 120. Generally, the ratio may be one or more (e.g., three) moles of hydrogen gas per mole of carbon monoxide. Any anode material may be used. The overall process is generally driven by the power source 106. Combinations of cathodes 120, electrolytes 122, catalysts 124, pH level, flow rate of carbon dioxide to the cell 102, and electric potential from the power source 106 may be used to control the reaction products of the cell 102. For example, increasing the flow rate of the carbon dioxide into a 100 milliliter (mL) cell 102 from 5 mL per minute to 10 mL per minute generally increases the yield (e.g., 10% to 20% increase) of carbon monoxide with a corresponding decrease in hydrogen gas.

The process is controlled to get a desired gases by using combinations of specific cathode materials, catalysts, electrolytes, surface morphology of the electrodes, pH levels, electrical potential, flow rate of the carbon dioxide and/or introduction of carbon dioxide relative to the cathode. Efficiency may be maximized by employing a catalyst/cathode combination selective for reduction of carbon dioxide to carbon monoxide in conjunction with cathode materials optimized for hydrogen gas evolution. An electrode material may be utilized that does not interact well with either the heterocyclic catalyst nor the carbon dioxide, but has a low overpotential for hydrogen evolution. Half cell potentials at the cathode 120 may range from −0.7 volts to −1.5 volts relative to the SCE, depending on the cathode material used.

Referring to FIG. 2, a table illustrating relative organic product yields for different cathodes are shown. The table generally shows gas evolution in the cell 102 with an aqueous solution of 0.5 M KCl and 10 mM pyridine. The carbon dioxide may be bubbled into the cell 102 at the rates ranging from 5 mL per minute to 10 mL per minute. In the presence of a heterocycle catalyst, combining cathode materials that produce mostly carbon monoxide (e.g, C, Cr, Nb, Sn and stainless steel) with materials producing mostly hydrogen gas (e.g., Ni, V and platinum group metals) a system making a desired ratio of carbon monoxide to hydrogen may be created. The electrode materials may be in bulk form or present as particles or nanoparticles loaded on to a substrate such as graphite, carbon fiber or other conductor. Further control over the reaction is generally possible by changing a pH level, cell electrical potential and the flow rate of the carbon dioxide. As illustrated, faradaic yields (FY) for one or both of carbon monoxide and the hydrogen gas may be at least 25% for several cathode materials.

Cell design and cathode treatment (e.g., surface morphology or surface texture) may both affect product yields and current density at the cathode 120. For instance, a divided cell 102 generally has higher yields with a heavily scratched (rough) cathode 120 than an unscratched (smooth) cathode 120. Matte tin generally performs different than bright tin. Maintaining carbon dioxide bubbling only on the cathode side of the divided cell 102 (e.g., in compartment 114b) may also increase yields.

Some process embodiments of the present invention for making synthesis gas generally consume a small amount of water (e.g., approximately 1 to 3 moles of water) per mole of carbon. Therefore, the processes may be a few thousand times more water efficient than existing production techniques.

Figure 3:
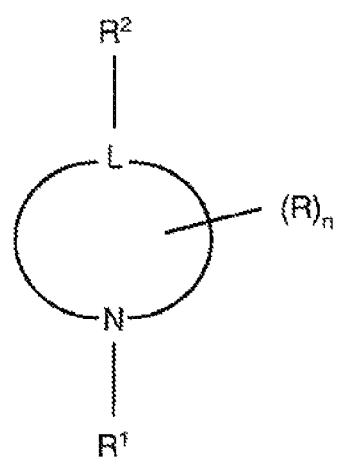
FIG. 3 is a formula of an aromatic heterocyclic amine catalyst.

Referring to FIG. 3, a formula of an aromatic heterocyclic amine catalyst is shown. The ring structure may be an aromatic 5-member heterocyclic ring or 6-member heterocyclic ring with at least one ring nitrogen and is optionally substituted at one or more ring positions other than nitrogen with R. L may be C or N. R1 may be H. R2 may be H if L is N or R2 is R if L is C. R is an optional substitutent on any ring carbon and may be independently selected from H, a straight chain or branched chain lower alkyl, hydroxyl, amino, pyridyl, or two R's taken together with the ring carbons bonded thereto are a fused six-member aryl ring and n=0 to 4.

Figure 4:
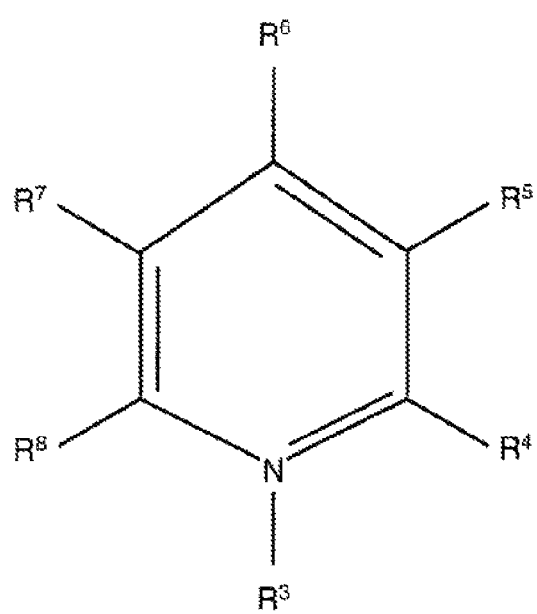
FIGS. 4-6 are formulae of substituted or unsubstituted aromatic 5-member heterocyclic amines or 6-member heterocyclic amines.
Figure 5:
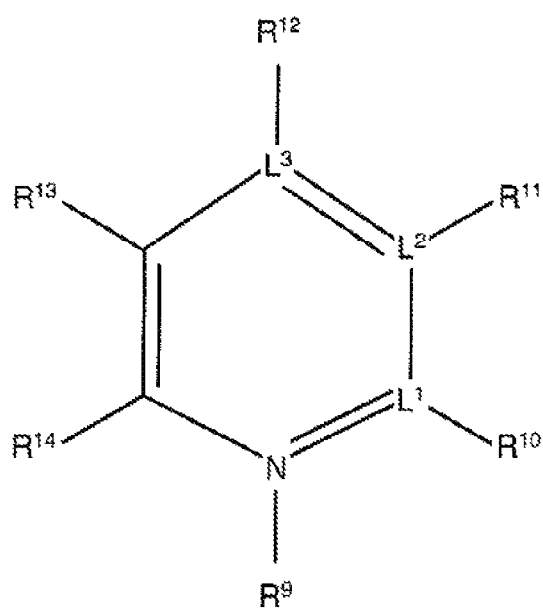
Figure 6:
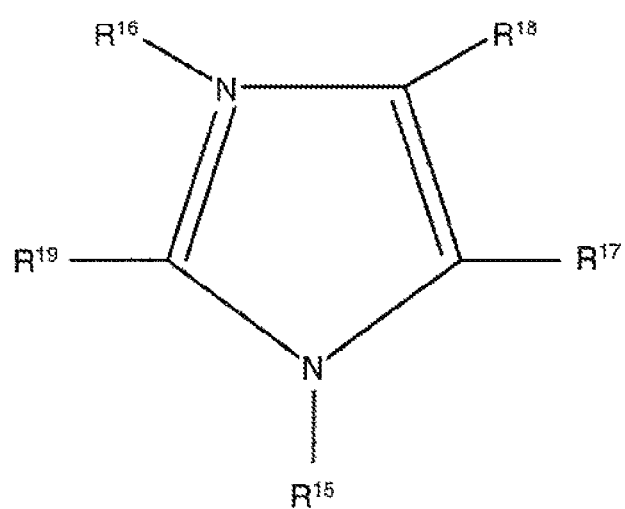

Referring to FIGS. 4-6, formulae of substituted or unsubstituted aromatic 5-member heterocyclic amines or 6-member heterocyclic amines are shown. Referring to FIG. 4, R3 may be H. R4, R5, R7 and R8 are generally independently H, straight chain or branched chain lower alkyl, hydroxyl, amino, or taken together are a fused six-member aryl ring. R6 may be H, straight chain or branched chain lower alkyl, hydroxyl, amino or pyridyl.

Referring to FIG. 5, one of L1, L2 and L3 may be N, while the other L's may be C. R9 may be H. If L1 is N, R10 may be H. If L2 is N, R11 may be H. If L3 is N, R12 may be H. If L1, L2 or L3 is C, then R10, R11, R12, R13 and R14 may be independently selected from straight chain or branched chain lower alkyl, hydroxyl, amino, or pyridyl.

Referring to FIG. 6, R15 and R16 may be H. R17, R18 and R19 are generally independently selected from straight chain or branched chain lower alkyl, hydroxyl, amino, or pyridyl.

Suitably, the concentration of aromatic heterocyclic amine catalysts is about 10 millimolar (mM) to 1 M. Concentrations of the electrolyte may be about 0.1 M to 1 M. The electrolyte may be suitably a salt, such as KCl, $NaNO_9$, $Na_2SO_4$, NaCl, NaF, $NaClO_4$, $KClO_4$, $K_2SiO_3$, or $CaCl_2$ at a concentration of about 0.5 M. Other electrolytes may include, but are not limited to, all group 1 cations (e.g., H, Li, Na, K, Rb and Cs) except Francium (Fr), Ca, ammonium cations, alkylammonium cations and alkyl amines. Additional electrolytes may include, but are not limited to, all group 17 anions (e.g., F, Cl, Br, I and At), berates, carbonates, nitrates, nitrites, perchlorates, phosphates, polyphosphates, silicates and sulfates. Na generally performs as well as K with regard to best practices, so NaCl may be exchanged with KCl. NaF may perform about as well as NaCl, so NaF may be exchanged for NaCl or KCl in many cases. Larger anions tend to change the chemistry and favor different products. For instance, sulfate may favor polymer or methanol production while Cl may favor products such as acetone. The pH of the solution is generally maintained at about pH 4 to 8, suitably about 4.7 to 5.6.

Some embodiments of the present invention may be further explained by the following examples, which should not be construed by way of limiting the scope of the invention.

Example 1: General Electrochemical Methods

Chemicals and materials. All chemicals used were >98% purity and used as received from the vendor (e.g., Aldrich), without further purification. Either deionized or high purity water (Nanopure, Barnstead) was used to prepare the aqueous electrolyte solutions.

Electrochemical system. The electrochemical system was composed of a standard two-compartment electrolysis cell 102 to separate the anode 118 and cathode 120 reactions. The compartments were separated by a porous glass frit or other ion conducting bridge 116. The electrolytes 122 were used at concentrations of 0.1 M to 1 M, with 0.5 M being a typical concentration. A concentration of between about 1 mM to 1 M of the catalyst 124 was used. The particular electrolyte 122 and particular catalyst 124 of each given test were generally selected based upon what product or products were being created.

Figure 7:
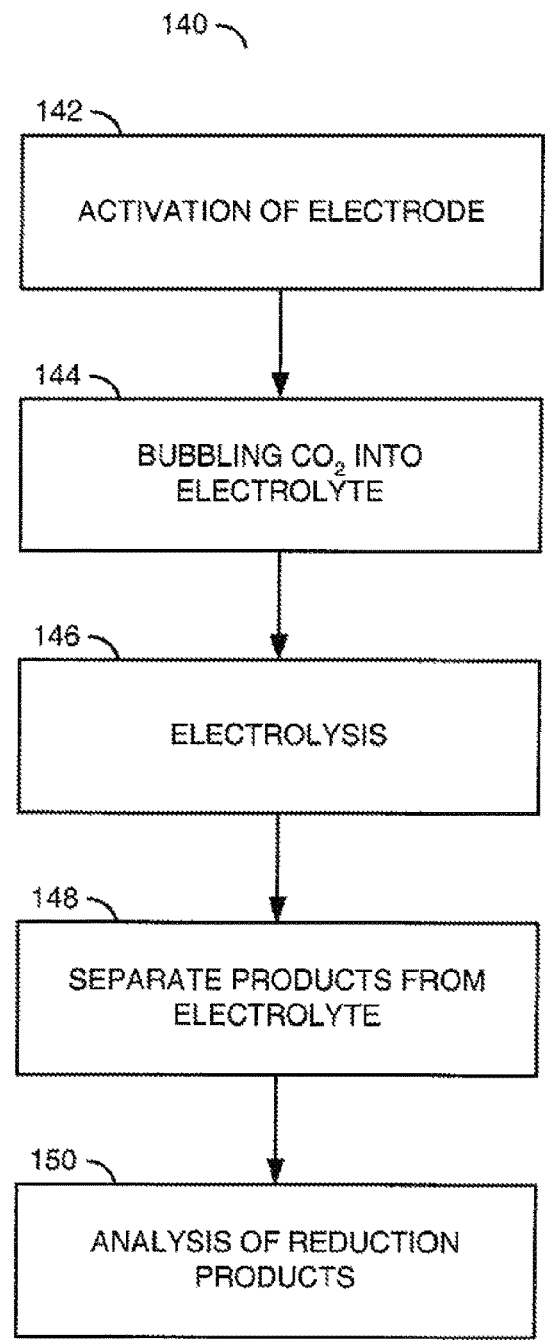
FIG. 7 is a flow diagram of an example method used in electrochemical examples.

Referring to FIG. 7, a flow diagram of an example method 140 used in the electrochemical examples is shown. The method (or process) 140 generally comprises a step (or block) 142, a step (or block) 144, a step (or block) 146, a step (or block) 148 and a step (or block) 150. The method 140 may be implemented using the system 100.

In the step 142, the electrodes 118 and 120 may be activated where appropriate. Bubbling of the carbon dioxide into the cell 102 may be performed in the step 144. Electrolysis of the carbon dioxide into various products may occur during step 146. In the step 148, the products may be separated from the electrolyte. Analysis of the reduction products may be performed in the step 150.

The working electrode was of a known area. All potentials were measured with respect to a saturated calomel reference electrode (Accumet). Before and during all electrolysis, carbon dioxide {Airgas} was continuously bubbled through the electrolyte to saturate the solution. The resulting pH of the solution was maintained at about pH 4 to pH 8 with a suitable range depending on what product or products were being made. For example, under constant carbon dioxide bubbling, the pH levels of 10 mM solutions of 4-hydroxy pyridine, pyridine and 4-tertbutyl pyridine were 4.7, 5.28 and 5.55, respectively.

Example 2: General Photoelectrochemical Methods

Chemicals and materials. All chemicals used were analytical grade or higher. Either deionized or high purity water (Nanopure, Barnstead) was used to prepare the aqueous electrolyte solutions.

Photoelectrochemical system. The photoelectrochemical system was composed of a Pyrex three-necked flask containing 0.5 M KCl as supporting electrolyte and a 1 mM to 1 M catalyst (e.g., mM pyridine or pyridine derivative). The photocathode was a single crystal p-type semiconductor etched for approximately 1 to 2 minutes in a bath of concentrated $HNO_3$:HCL, 2:1 v/v prior to use. An ohmic contact was made to the back of the freshly etched crystal using an indium/zinc (2 wt. % Zn) solder. The contact was connected to an external lead with conducting silver epoxy (Epoxy Technology H31) covered in glass tubing and insulated using an epoxy cement (Loctite 0151 Hysol) to expose only the front face of the semiconductor to solution. All potentials were referenced against a saturated calomel electrode (Accumet). The three elect/ode assembly was completed with a carbon rod counter electrode to minimize the reoxidation of reduced carbon dioxide products. During all electrolysis, carbon dioxide gas (Airgas) was continuously bubbled through the electrolyte to saturate the solution. The resulting pH of the solution was maintained at about pH 4 to 8 (e.g., pH 5.2).

Figure 8:
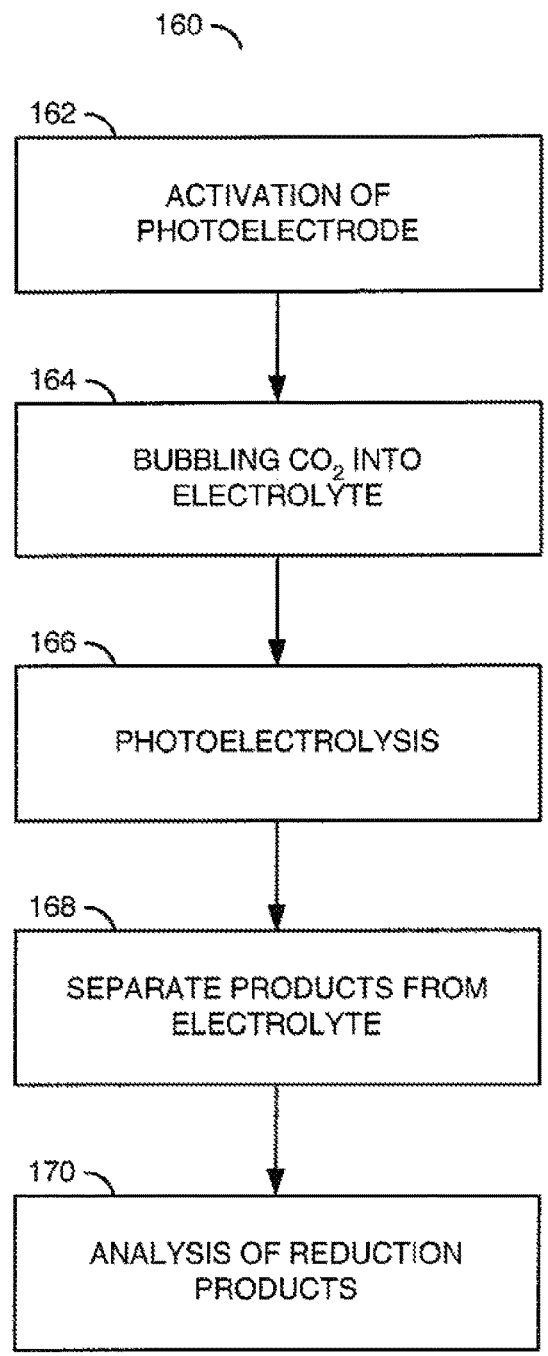
FIG. 8 is a flow diagram of an example method used in photochemical examples.

Referring to FIG. 8, a flow diagram of an example method 160 used in the photochemical examples is shown. The method (or process) 160 generally comprises a step (or block) 162, a step (or block) 164, a step (or block) 166, a step (or block) 168 and a step (or block) 170. The method 160 may be implemented using the system 100.

In the step 162, the photoelectrode may be activated. Bubbling of the carbon dioxide into the cell 102 may be performed in the step 164. Electrolysis of the carbon dioxide into various products may occur during step 166. In the step 168, the products may be separated from the electrolyte. Analysis of the reduction products may be performed in the step 170.

Light sources. Four different light sources were used for the illumination of the p-type semiconductor electrode. For initial electrolysis experiments, a Hg—Xe arc lamp (USHIO UXM 200H) was used in a lamp housing (PTI Model A-101.0) and powered by a PTI LTS-200 power supply. Similarly, a Xe arc lamp (USHIO UXL 151H) was used in the same housing in conjunction with a PTI monochromator to illuminate the electrode at various specific wavelengths.

A fiber optic spectrometer (Ocean Optics S 2000) or a silicon photodetector (Newport 818-SL silicon detector) was used to measure the relative resulting power emitted through the monochromator. The flatband potential was obtained by measurements of the open circuit photovoltage during various irradiation intensities using the 200 watt (W) Hg—Xe lamp (3 w/cm$^2$-23 W/cm$^2$). The photovoltage was observed to saturate at intensities above approximately 6 W/cm$^2$.

For quantum yield determinations, electrolysis was performed under illumination by two different light-emitting diodes (LEDs). A blue LED (Luxeon V Dental Blue, Future Electronics) with a luminous output of 500 milliwatt (mW)+/−50 mW at 465 nanometers (nm) and a 20 run full width at half maximum (FWHM) was driven at to a maximum rated current of 700 mA using a Xitanium Driver (Advance Transformer Company). A Fraen collimating lens (Future Electronics) was used to direct the output light. The resultant power density that reached the window of the photoelectrochemical cell was determined to be 42 mW/cm$^2$, measured using a Scientech 364 thermopile power meter and silicon photodetector. The measured power density was assumed to be greater than the actual power density observed at the semiconductor face due to luminous intensity loss through the solution layer between the wall of the photoelectrochemical cell and the electrode.

Example 3: Analysis of Products of Electrolysis

Electrochemical experiments were generally performed using a CH Instruments potentiostat or a DC power supply with current logger to run bulk electrolysis experiments. The CH Instruments potentiostat was generally used for cyclic voltammetry. Electrolysis was run under potentiostatic conditions from approximately 6 hours to 30 hours until a relatively similar amount of charge was passed for each run.

Gas Chromatography and Detection of Gaseous Products. The gas products evolved during electrolysis were analyzed using a Quest Technologies CO detector and a QMS300 quadrupole mass spectrometer. For dissolved products in the aqueous phase, the removal of the supporting electrolyte salt was first achieved with an Amberlite IRN-150 ion exchange resin (cleaned prior to use to ensure no organic artifacts by stirring in a 0.1% v/v aqueous 2.5 solution of Triton X-100, reduced (Aldrich), filtered and rinsed with a copious amount of water, and vacuum dried below the maximum temperature of the resin (approximately 60° C.) before the sample was directly injected into the GC which housed a DB-Wax column (Agilent Technologies, 60 m, 1 micrometer (μm) film thickness). Approximately 1 gram of resin was used to remove the salt from 1 milliliter (mL) of the sample. The injector temperature was held at 200° C., the oven temperature maintained at 120° C., and the detector temperature at 200° C.

Carbon dioxide may be efficiently converted to value-added gases, using either a minimum of electricity (that could be generated from an alternate energy source) or directly using visible light. Some processes described above may generate high energy density fuels that are not fossil-based as well as being chemical feedstock that are not fossil or biologically based. Moreover, the catalysts for the processes may be substituents-sensitive and provide for selectivity of the value-added gases.

By way of example, a fixed cathode may be used in an electrochemical system where the electrolyte and/or catalyst are altered to change the gas mix. In a modular electrochemical system, the cathodes may be swapped out with different materials to change the gas mix. In a photoelectrochemical system, the anode and/or cathode may use different photovoltaic materials to change the gas mix.

Some embodiments of the present invention generally provide for new cathode combinations for simultaneous evolution of carbon monoxide and hydrogen gas using carbon dioxide and water as feedstock. Specific combinations of cathode materials, electrolytes, catalysts, pH levels and/or electrical potentials may be established that optimize the carbon dioxide conversion to carbon monoxide while also optimizing hydrogen gas evolution. Choice of specific configurations of heterocyclic amine catalysts with engineered functional groups may be utilized in the system 100. Process conditions described above may facilitate long life (e.g., improved stability), electrode and cell cycling and product recovery.

Various process conditions disclosed above, including electrolyte choice, cell voltage, and manner in which the carbon dioxide is bubbled, generally improve control of the reaction so that precise molar ratios within synthesis gas may be maintained with little or no byproducts. Greater control over the reaction generally opens the possibility for commercial systems that are modular and adaptable to make different gases. The new materials and process conditions combinations generally have high faradaic efficiency and relatively low cell potentials, which allows an energy efficient cell to be constructed.

While the invention has been particularly shown and described with reference to the preferred embodiments thereof, it will be understood by those skilled in the art that various changes in form and details may be made without departing from the scope of the invention.

What is claimed is:

1. A method for electrochemical production of synthesis gas from water and carbon dioxide, comprising the steps of:
    (A) bubbling carbon dioxide into a solution of an electrolyte and a catalyst in a divided electrochemical cell, wherein
        (i) said divided electrochemical cell comprises an anode in a first cell compartment and a cathode in a second cell compartment, wherein said cathode comprises an electrode material present as particles or nanoparticles loaded onto a substrate,
    where the electrode material is selected from the group consisting of Al, Au, Ag, Cd, C, Co, Cr, Cu, Cu alloys, Ga, Hg, In, Ir, Mo, Nb, Ni, Ni alloys, Ni—Fe alloys, Os, Pd, Pt, Rh, Ru, Sn, Sn alloys, Ti, V, W, Zn, stainless steel, austenitic steel, terrific steel, duplex steel, martensitic steel, Nichrome, elgiloy, degenerately doped p-Si, degenerately doped p-Si:As and degenerately doped p-Si:B, and wherein the substrate comprises graphite, carbon fiber or another conductor,
        (ii) said carbon dioxide is reduced at the cathode into a plurality of components, said components comprising carbon monoxide, and the water is oxidized into protons and oxygen at the anode and said protons from the oxidized water are reduced to hydrogen gas at the cathode; and
    (B) separating the synthesis gas from the solution.

2. The method according to claim 1, wherein said cathode comprises a mix of electrode materials present as particles or nanoparticles loaded onto a substrate,
    where the electrode materials are selected from the group consisting of Al, Au, Ag, Cd, C, Co, Cr, Cu, Cu alloys, Ga, Hg, In, Ir, Mo, Nb, Ni, Ni alloys, Ni—Fe alloys, Os, Pd, Pt, Rh, Ru, Sn, Sn alloys, Ti, V, W, Zn, stainless steel, austenitic steel, ferritic steel, duplex steel, martensitic steel, Nichrome, elgiloy, degenerately doped p-Si, degenerately doped p-Si:As and degenerately doped p-Si:B; and
    wherein the substrate comprises graphite, carbon fiber or another conductor.

3. The method according to claim 1, wherein said cathode comprises an alloy and/or aggregate of electrode materials, present as particles or nanoparticles loaded onto the substrate,
    where the electrode materials are selected from the group consisting of Al, Au, Ag, Cd, C, Co, Cr, Cu, Cu alloys, Ga, Hg, In, Ir, Mo, Nb, Ni, Ni alloys, Ni—Fe alloys, Os, Pd, Pt, Rh, Ru, Sn, Sn alloys, Ti, V, W, Zn, stainless steel, austenitic steel, ferritic steel, duplex steel, martensitic steel, Nichrome, elgiloy, degenerately doped p-Si, degenerately doped p-Si:As and degenerately doped p-Si:B; and
    wherein the substrate comprises graphite, carbon fiber or other conductor.

4. The method according to claim 1, wherein said cathode comprises a combination of electrode materials present as particles or nanoparticles loaded onto a substrate,
    wherein one electrode material is selected from the group consisting of C, Cr, Nb, Sn and stainless steel and
    wherein another electrode material is selected from the group of Ni, V Ni, V, Ir, Os, Pd, Pt, Rh and Ru; and
    wherein the substrate comprises graphite, carbon fiber or another conductor.

5. The method according to claim 1, wherein hydrogen gas and carbon monoxide are produced at the cathode in a ratio of one or more moles of hydrogen gas per mole of carbon monoxide.

6. The method according to claim 1, wherein the catalyst is a substituted or unsubstituted aromatic heterocyclic amine.

7. The method according to claim 1, wherein the catalyst is selected from pyridines, imidazoles, bipyridines, thiazoles, oxazoles, quinolines, adenine, benzimidazole and 1,10-phenanthroline.

8. The method according to claim 1, wherein the half cell potentials at the cathode range from 0.7 volts to 1.5 volts relative to a saturated calomel electrode.

9. The method according to claim 1, wherein the electrolyte is at least one of $Na_2SO_4$, KCl, $NaNO_3$, NaCl, NaF, $NaClO_4$, $KClO_4$, $K_2SiO_3$, $CaCl_2$, a H cation, a Li cation, a Na cation, a K cation, a Rb cation, a Cs cation, a Ca cation, an ammonium cation, an alkylammonium cation, a F anion, a Cl anion, a Br anion, an I anion, an At anion, an alkyl amine, berates, carbonates, nitrites, nitrates, phosphates, polyphosphates, perchlorates, silicates, sulfates, and a tetraalkyl ammonium salt.

\* \* \* \* \*